United States Patent
Sun et al.

(10) Patent No.: US 11,234,227 B2
(45) Date of Patent: Jan. 25, 2022

(54) SEARCH SPACE-BASED REUSE EXCEPTION RULES

(71) Applicant: QUALCOMM Incorporated, San Diego, CA (US)

(72) Inventors: Jing Sun, San Diego, CA (US); Heechoon Lee, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 16/119,179

(22) Filed: Aug. 31, 2018

(65) Prior Publication Data

US 2019/0075553 A1 Mar. 7, 2019

Related U.S. Application Data

(60) Provisional application No. 62/555,518, filed on Sep. 7, 2017.

(51) Int. Cl.
| | |
|---|---|
| *H04W 72/04* | (2009.01) |
| *H04J 11/00* | (2006.01) |
| *H04W 28/26* | (2009.01) |
| *H04W 76/27* | (2018.01) |
| *H04W 88/02* | (2009.01) |
| *H04L 5/00* | (2006.01) |

(52) U.S. Cl.
CPC ....... *H04W 72/042* (2013.01); *H04W 72/046* (2013.01); *H04L 5/0053* (2013.01); *H04W 76/27* (2018.02); *H04W 88/02* (2013.01)

(58) Field of Classification Search
CPC ... H04L 1/0068; H04L 1/0067; H04L 5/0051; H04L 5/0055; H04L 5/0044; H04L 5/0053; H04L 5/0037; H04L 5/001; H04W 72/042; H04W 72/046; H04W 76/27; H04W 88/02; H04W 72/048
USPC .......................................................... 370/329
See application file for complete search history.

(56) References Cited

U.S. PATENT DOCUMENTS

| | | | | |
|---|---|---|---|---|
| 9,800,385 | B2 * | 10/2017 | Wang ..................... | H04L 5/0048 |
| 2011/0261768 | A1 * | 10/2011 | Luo ........................ | H04L 5/0053 |
| | | | | 370/329 |
| 2012/0063401 | A1 * | 3/2012 | Xue ........................ | H04L 5/001 |
| | | | | 370/329 |
| 2012/0275406 | A1 * | 11/2012 | Ji ........................... | H04W 72/048 |
| | | | | 370/329 |

(Continued)

OTHER PUBLICATIONS

Nokia et al. "Resource sharing between PDCCH and PDSCH in NR", 3GPP Draft; R1-1714098, 3rd Generation Partnership Project (3GPP), Mobile Competence Centre; 650, Route Des Lucioles; F-06921 Sophia-Antipolis Cedex; France (Year: 2017).*

(Continued)

*Primary Examiner* — Edan Orgad
*Assistant Examiner* — Vanneilian Lalchinthang
(74) *Attorney, Agent, or Firm* — Holland & Hart LLP

(57) ABSTRACT

Methods, systems, and devices for wireless communications are described. A base station may select, for a user equipment (UE), one or more reuse exception rules to be applied by the UE when reusing one or more resource sets for data communication. The base station may signal the one or more reuse exception rules to the UE. The base station may communicate with the UE in accordance with the one or more reuse exception rules.

30 Claims, 15 Drawing Sheets

(56) References Cited

U.S. PATENT DOCUMENTS

| | | | |
|---|---|---|---|
| 2014/0369293 A1* | 12/2014 | Guo | H04L 5/0073 370/329 |
| 2016/0205675 A1* | 7/2016 | Zhang | H04W 72/044 455/450 |
| 2017/0318605 A1* | 11/2017 | Wijetunge | H04W 16/32 |
| 2018/0132211 A1* | 5/2018 | Huang | H04L 5/0053 |
| 2018/0270713 A1* | 9/2018 | Park | H04W 28/18 |
| 2019/0044649 A1* | 2/2019 | Kim | H04L 1/00 |
| 2019/0053318 A1* | 2/2019 | Nogami | H04W 76/27 |
| 2019/0150131 A1* | 5/2019 | Chen | H04L 5/1469 370/280 |

OTHER PUBLICATIONS

Nokia et al., "Resource sharing between PDCCH and POSCH in NR", 3GPP Draft; R1-1710983_Resource sharing between PDCCH and PDSCH_Final, 3rd Generation Partnership Project (3GPP), Mobile Competence Centre, 650, Route Des Lucioles, F-06921 Sophia-Antipolis Cedex, France vol. RAN WG1, China Jun. 26, 2017 (Year: 2017).*

Ericsson, "Summary of E-Mail Discussions on Downlink Control Signaling", 3GPP Draft, R1-1701036, Summary of E-Mail Disc on Dl Ctrl Sig, 3rd Generation Partnership Project (3GPP), Mobile Competence Centre, 650, Route Des Lucioles, F-06921 Sophia-Antipolis Cedex, France vol. RAN WG1, No. Spokane, WA, USA, Jan. 16, 2017-Jan. 20, 2017, Jan. 16, 2017 (Jan. 16, 2017), XP051208551, Retrieved from the Internet: URL:http://www.3gpp.org/ftp/Meetings_3GPPSYNC/RAN1 /Docs/ [retrieved on Jan. 16, 2017].

Huawei et al., "sPDCCH Multiplexing with Data", 3GPP Draft; R1-1706990, 3rd Generation Partnership Project (3GPP), Mobile Competence Centre, 650, Route Des Lucioles, F-06921 Sophia-Antipolis Cedex, France vol. RAN WG1, No. Hangzhou, China; May 15, 2017-May 19, 2017 May 14, 2017, XP051272220, Retrieved from the Internet: URL:http://www.3gpp.org/ftp/Meetings_3GPP_SYNC/RAN1/Docs/ [retrieved on May 14, 2017], 6 pages.

International Search Report and Written Opinion—PCT/US2018/049325—ISA/EPO—dated Nov. 27, 2018 (176225WO).

Nokia et al., "Resource sharing between PDCCH and PDSCH in NR", 3GPP Draft; R1-1710983_Resource sharing between PDCCH and PDSCH_Final, 3rd Generation Partnership Project (3GPP), Mobile Competence Centre, 650, Route Des Lucioles, F-06921 Sophia-Antipolis Cedex, France vol. RAN WG1, No. Qingdao, China; Jun. 27, 2017-Jun. 30, 2017 Jun. 26, 2017, XP051300183, Retrieved from the Internet: URL:http://www.3gpp.org/ftp/Meetings_3GPP_SYNC/RAN1/Docs/ [retrieved on Jun. 26, 2017], 7 pages.

Nokia et al., "Resource Sharing between PDCCH and PDSCH in NR", 3GPP Draft; R1-1714098, 3rd Generation Partnership Project (3GPP), Mobile Competence Centre, 650, Route Des Lucioles, F-06921 Sophia-Antipolis Cedex, France vol. RAN WG1, No. Prague, Czech Republic; Aug. 21, 2017-Aug. 25, 2017 Aug. 20, 2017, XP051316888, Retrieved from the Internet: URL:http://www.3gpp.org/ftp/Meetings_3GPP_SYNC/RAN1/Docs/ [retrieved on Aug. 20, 2017], 4 pages.

* cited by examiner

US 11,234,227 B2

SEARCH SPACE-BASED REUSE EXCEPTION RULES

CROSS REFERENCES

The present application for patent claims the benefit of U.S. Provisional Patent Application No. 62/555,518 by SUN, et al., entitled "SEARCH SPACE-BASED REUSE EXCEPTION RULES," filed Sep. 7, 2017, assigned to the assignee hereof, and expressly incorporated by reference herein.

BACKGROUND

The following relates generally to wireless communication, and more specifically to search space-based reuse exception rules.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Certain wireless communication systems may be configured to support control information being sent in a control resource set (coreset) that includes a physical resource block (PRB) that is transmitted over a number of OFDM symbols. Such configurations provide frequency diversity by spreading the control information (e.g., physical downlink control channel (PDCCH) information) over the coreset. In some aspects, an unused (e.g., empty) coreset may be reused for data communications, e.g., downlink and/or uplink communications. Reuse of a coreset may be based on specific rules, known as reuse rules. Additionally, exceptions to the specific reuse rules, known as reuse exception rules, exist. The reuse exception rules allow for more liberal reuse of the coreset than that allowed by the reuse rules. Aspects of the present disclosure improve the reuse efficiency for unused control resources.

SUMMARY

The described techniques relate to improved methods, systems, devices, or apparatuses that support search space-based reuse exception rules. Generally, the described techniques provide for reuse exception rules for region based reuse, such as search space-based (or sub-search space-based) rate matching reuse exception rules. For example, a base station may select and indicate to a user equipment (UE) reuse exception rules that are based on a search space. The reuse exception rule(s) may be search space-based. Search spaces identified by the signaled reuse exception rule(s) may include a set of physical downlink control channel (PDCCH) decoding candidates (e.g., scheduled PDCCH signal locations), or the corresponding resource elements (REs), that the UE should assume its physical downlink shared channel (PDSCH) signal will not be mapped into (e.g., even if the UE is signaled by layer 1 (L1) signaling that the region is reusable). The base station may signal the indication of the reuse exception rule(s) to the UE and the base station and UE may communicate in accordance with the reuse exception rule(s). In some aspects, signaling the reuse exception rule(s) may be implicit in that the one or more reuse exception rules are based on the search space.

A method of wireless communication is described. The method may include selecting, for a UE, one or more reuse exception rules to be applied by the UE when reusing one or more resource sets for data communication, signaling the one or more reuse exception rules to the UE, and communicating with the UE in accordance with the one or more reuse exception rules.

An apparatus for wireless communication is described. The apparatus may include means for selecting, for a UE, one or more reuse exception rules to be applied by the UE when reusing one or more resource sets for data communication, means for signaling the one or more reuse exception rules to the UE, and means for communicating with the UE in accordance with the one or more reuse exception rules.

Another apparatus for wireless communication is described. The apparatus may include a processor, memory in electronic communication with the processor, and instructions stored in the memory. The instructions may be operable to cause the processor to select, for a UE, one or more reuse exception rules to be applied by the UE when reusing one or more resource sets for data communication, signal the one or more reuse exception rules to the UE, and communicate with the UE in accordance with the one or more reuse exception rules.

A non-transitory computer readable medium for wireless communication is described. The non-transitory computer-readable medium may include instructions operable to cause a processor to select, for a UE, one or more reuse exception rules to be applied by the UE when reusing one or more resource sets for data communication, signal the one or more reuse exception rules to the UE, and communicate with the UE in accordance with the one or more reuse exception rules.

In some examples of the method, apparatus, and non-transitory computer-readable medium described above, selecting the one or more reuse exception rules comprises: selecting the one or more reuse exception rules to be applied by the UE from a plurality of search space-based rate matching reuse exception rules.

In some examples of the method, apparatus, and non-transitory computer-readable medium described above, selecting the one or more reuse exception rules comprises: selecting a reuse exception rule that allows the UE to reuse the resource set and rate match around, for data communication, one or more resources of the resource set based on a group common PDCCH (GC-PDCCH) search space.

In some examples of the method, apparatus, and non-transitory computer-readable medium described above, selecting the one or more reuse exception rules comprises: selecting a reuse exception rule that allows the UE to reuse the resource set and rate match around, for data communication, one or more resources of the resource set based on a common PDCCH search space.

In some examples of the method, apparatus, and non-transitory computer-readable medium described above, selecting the one or more reuse exception rules comprises: selecting a reuse exception rule that allows the UE to reuse the resource set and rate match around, for data communication, one or more resources of the resource set based on a UE-specific PDCCH search space.

Some examples of the method, apparatus, and non-transitory computer-readable medium described above may further include processes, features, means, or instructions for transmitting, in the UE-specific PDCCH search space, one or more PDCCH signals comprising a plurality of resource grants for the UE.

In some examples of the method, apparatus, and non-transitory computer-readable medium described above, selecting the one or more reuse exception rules comprises: selecting a reuse exception rule that allows the UE to reuse the resource set and rate match around, for data communication, one or more resources of the control resource set based on a subset of a UE-specific PDCCH search space.

In some examples of the method, apparatus, and non-transitory computer-readable medium described above, the UE-specific PDCCH search space may be determined by an aggregation level (AL) of a current PDCCH granting a PDSCH to the UE.

In some examples of the method, apparatus, and non-transitory computer-readable medium described above, the subset of UE-specific PDCCH search space comprises one or more decoding candidates having the same AL as the AL of the current PDCCH granting the PDSCH to the UE.

In some examples of the method, apparatus, and non-transitory computer-readable medium described above, the subset of UE-specific PDCCH search space comprises one or more decoding candidates having the same or lower AL as the AL of the current PDCCH granting the PDSCH to the UE.

Some examples of the method, apparatus, and non-transitory computer-readable medium described above may further include processes, features, means, or instructions for transmitting, in a search space associated with the UE, one or more PDCCH signals comprising one or more resource grants for the UE.

In some examples of the method, apparatus, and non-transitory computer-readable medium described above, signaling the one or more reuse exception rules to the UE comprises: identifying an index associated with each of the one or more reuse exception rules. Some examples of the method, apparatus, and non-transitory computer-readable medium described above may further include processes, features, means, or instructions for communicating an indication of the index to the UE.

In some examples of the method, apparatus, and non-transitory computer-readable medium described above, signaling the one or more reuse exception rules to the UE comprises: identifying an index associated with a subset of rules of the one or more reuse exception rules. Some examples of the method, apparatus, and non-transitory computer-readable medium described above may further include processes, features, means, or instructions for communicating an indication of the index to the UE.

Some examples of the method, apparatus, and non-transitory computer-readable medium described above may further include processes, features, means, or instructions for transmitting radio resource control (RRC) signaling to configure the resource set. Some examples of the method, apparatus, and non-transitory computer-readable medium described above may further include processes, features, means, or instructions for transmitting L1 signaling to indicate resource set reuse.

In some examples of the method, apparatus, and non-transitory computer-readable medium described above, the resource set comprises a control resource set, or a set of control resource sets, or a subset of resources of a control resource set, or any combinations thereof.

A method of wireless communication is described. The method may include receiving a signal from a base station identifying one or more reuse exception rules to be applied by the UE for reusing one or more resource sets for data communication and communicating with the base station in accordance with the one or more reuse exception rules.

An apparatus for wireless communication is described. The apparatus may include means for receiving a signal from a base station identifying one or more reuse exception rules to be applied by the UE for reusing one or more resource sets for data communication and means for communicating with the base station in accordance with the one or more reuse exception rules.

Another apparatus for wireless communication is described. The apparatus may include a processor, memory in electronic communication with the processor, and instructions stored in the memory. The instructions may be operable to cause the processor to receive a signal from a base station identifying one or more reuse exception rules to be applied by the UE for reusing one or more resource sets for data communication and communicate with the base station in accordance with the one or more reuse exception rules.

A non-transitory computer readable medium for wireless communication is described. The non-transitory computer-readable medium may include instructions operable to cause a processor to receive a signal from a base station identifying one or more reuse exception rules to be applied by the UE for reusing one or more resource sets for data communication and communicate with the base station in accordance with the one or more reuse exception rules.

In some examples of the method, apparatus, and non-transitory computer-readable medium described above, the one or more reuse exception rules to be applied by the UE may be search space-based rate matching reuse exception rules.

Some examples of the method, apparatus, and non-transitory computer-readable medium described above may further include processes, features, means, or instructions for identifying a GC-PDCCH search space associated with the UE. Some examples of the method, apparatus, and non-transitory computer-readable medium described above may further include processes, features, means, or instructions for applying a reuse exception rule of the one or more reuse exception rules that allows the UE to reuse the resource set and rate match around, for data communication, one or more resources of the resource set based at least in part on the GC-PDCCH search space.

Some examples of the method, apparatus, and non-transitory computer-readable medium described above may further include processes, features, means, or instructions for identifying a common PDCCH search space associated with the UE. Some examples of the method, apparatus, and non-transitory computer-readable medium described above may further include processes, features, means, or instructions for applying a reuse exception rule of the one or more reuse exception rules that allows the UE to reuse the resource set and rate match around, for data communication, one or more resources of the resource set based at least in part on the common PDCCH search space.

Some examples of the method, apparatus, and non-transitory computer-readable medium described above may further include processes, features, means, or instructions for identifying a UE-specific PDCCH search space associated with the UE. Some examples of the method, apparatus, and non-transitory computer-readable medium described above may further include processes, features, means, or instructions for applying a reuse exception rule of the one or more reuse exception rules that allows the UE to reuse the resource set and rate match around, for data communication, one or more resources of the resource set based at least in part on the UE-specific PDCCH search space.

Some examples of the method, apparatus, and non-transitory computer-readable medium described above may further include processes, features, means, or instructions for receiving, in the UE-specific PDCCH search space, one or more PDCCH signals comprising a plurality of resource grants for the UE.

Some examples of the method, apparatus, and non-transitory computer-readable medium described above may further include processes, features, means, or instructions for identifying a subset of a UE-specific PDCCH search space associated with the UE. Some examples of the method, apparatus, and non-transitory computer-readable medium described above may further include processes, features, means, or instructions for applying a reuse exception rule of the one or more reuse exception rules that allows the UE to reuse the resource set and rate match, for data communication, one or more resources of the resource set based at least in part on the subset of the UE-specific PDCCH search space.

In some examples of the method, apparatus, and non-transitory computer-readable medium described above, the UE-specific PDCCH search space may be determined by an AL of a current PDCCH granting a PDSCH to the UE.

In some examples of the method, apparatus, and non-transitory computer-readable medium described above, the subset of UE-specific PDCCH search space comprises one or more decoding candidates having the same AL as the AL of the current PDCCH granting the PDSCH to the UE.

In some examples of the method, apparatus, and non-transitory computer-readable medium described above, the subset of UE-specific PDCCH search space comprises one or more decoding candidates having the same or lower AL as the AL of the current PDCCH granting the PDSCH to the UE.

Some examples of the method, apparatus, and non-transitory computer-readable medium described above may further include processes, features, means, or instructions for receiving, in a search space associated with the UE, one or more PDCCH signals comprising one or more resource grants for the UE.

Some examples of the method, apparatus, and non-transitory computer-readable medium described above may further include processes, features, means, or instructions for receiving an indication of an index associated with each of the one or more reuse exception rules. Some examples of the method, apparatus, and non-transitory computer-readable medium described above may further include processes, features, means, or instructions for identifying the one or more reuse exception rules based at least in part on the indication.

Some examples of the method, apparatus, and non-transitory computer-readable medium described above may further include processes, features, means, or instructions for receiving an indication of an index associated with a subset of rules of the one or more reuse exception rules. Some examples of the method, apparatus, and non-transitory computer-readable medium described above may further include processes, features, means, or instructions for identifying the one or more reuse exception rules based at least in part on the indication.

Some examples of the method, apparatus, and non-transitory computer-readable medium described above may further include processes, features, means, or instructions for receiving RRC signaling configuring the resource sets. Some examples of the method, apparatus, and non-transitory computer-readable medium described above may further include processes, features, means, or instructions for receiving L1 signaling indicating resource set reuse.

In some examples of the method, apparatus, and non-transitory computer-readable medium described above, the resource set comprises a control resource set, or a set of control resource sets, or a subset of resources of a control resource set, or any combinations thereof.

DETAILED DESCRIPTION

Figure 1:
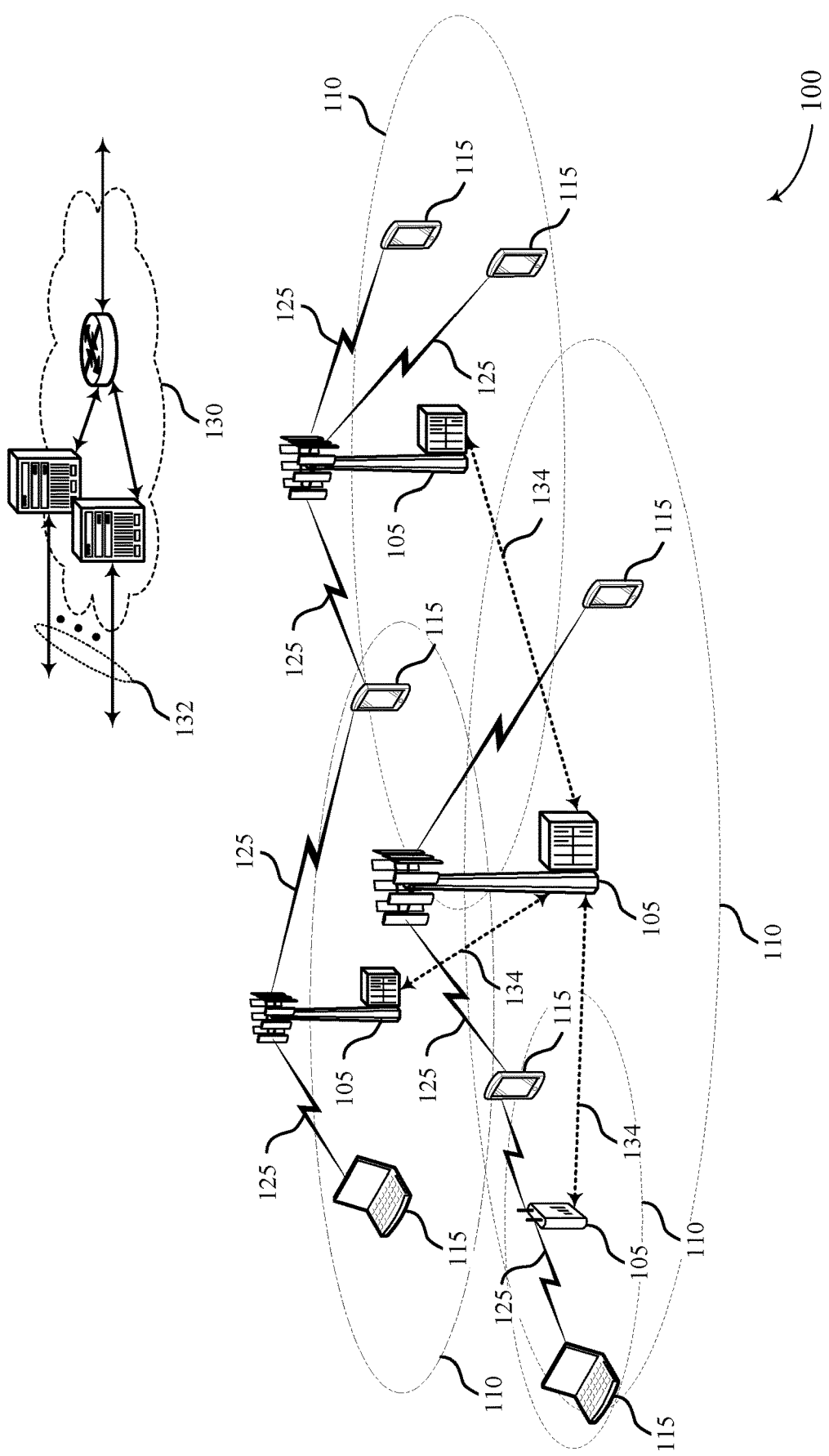
FIG. 1 illustrates an example of a system for wireless communication that supports search space-based reuse exception rules in accordance with aspects of the present disclosure.

Wireless communication systems may be configured where a base station transmits control information to user equipment (UE) using a control resource set. The control resource set may be defined in conventional systems as a coreset that includes a physical resource block (PRB) spread over a certain number of orthogonal frequency division multiplexing (OFDM) symbols. That is, the control information (e.g., physical downlink control channel (PDCCH) signals) may be transmitted in a downlink transmission from the base station to the UE(s). However, in some instances the resources in the control resource set may be empty or unused. In this instance, the rule has been defined that the UE and base station may reuse the empty control set resources for data communications, e.g., downlink communications using physical downlink shared channel (PDSCH) transmissions and/or uplink communications using physical uplink shared channel (PUSCH) transmissions. While generic exceptions to the reuse rule have been defined, the generic exceptions are not applicable to many situations and may thus leads to low reuse efficiency. Aspects of the described techniques provide for additional reuse exception rules that improve reuse efficiency of unused control resources.

A coreset may include a subset of the coreset, a single coreset, or a set of coresets. Conventionally, coresets are defined semi-statically, e.g., using radio resource control (RRC) signaling, and reusable coreset(s) (e.g., empty coreset(s)) may be signaled using layer 1 (L1) signaling. The exceptions to the reuse rules (the reuse exception rules) may allow reuse of unused portions of a coreset that are mapped for PDCCH signals. For example, the L1 signaling may indicate that a region of the coreset is mapped (e.g., being used), but the coreset may include a PDCCH signal that grants PDSCH resources for the unused regions of the coreset. The UE may rate match around the PDCCH for the unused region(s) of the coreset(s) for data communications using the unused resources. Other examples include the UE rate matching around wideband reference signals configured for a coreset. Rate matching may allow improved coreset reuse when there is additional information e.g., the information is free when a PDCCH signal is used because the UE knows where the PDCCH signal is located when the PDSCH signal is received.

Aspects of the disclosure are initially described in the context of a wireless communications system. In some aspects, a base station may identify, determine, or otherwise select a reuse exception rule(s) for a UE to apply when reusing unused resources in a resource set (e.g., a subset of, all, or multiple control resource sets). The unused resources may be resources within a control resource set and the reuse exception rule(s) may be based on a search space that is known by the UE, e.g., configured by the base station. The search space may include a common search space-based (e.g., known by all UEs), a group common search space-based (e.g., known by a set of UEs, such as a GC-PDCCH search space), and/or a UE-specific search space-based (e.g., known by a particular UE). The base station and/or UE may be preconfigured with all available reuse exception rules and the base station may signal an indication of the selected (or active) reuse exception rule(s) that are to be applied by the UE. In some aspects, signaling the reuse exception rule(s) may be implicit in that defining the search space known by UE(s) carries the indication of the reuse exception rule to be applied. In some aspects, the base station may signal the reuse exception rule(s) using an index value/parameter that is known by the UE. The UE may use the index to access a set of reuse exception rule(s) to determine which reuse exception rule(s) is to be applied. Accordingly, the UE and base station may communicate in accordance with the search space-based reuse exception rule(s).

Aspects of the disclosure are further illustrated by and described with reference to apparatus diagrams, system diagrams, and flowcharts that relate to search space-based reuse exception rules.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

One or more of the base stations 105 may select, for a UE 115, one or more reuse exception rules to be applied by the UE 115 when reusing one or more resource sets for data communication. The one or more base stations 105 may signal the one or more reuse exception rules to the UE 115. The one or more base stations 105 may communicate with the UE 115 in accordance with the one or more reuse exception rules.

From another perspective, one or more of the UEs 115 may receive a signal from a base station 105 identifying one or more reuse exception rules to be applied by the UE 115 for reusing one or more resource sets for data communication. The one or more UEs 115 may communicate with the base station 105 in accordance with the one or more reuse exception rules.

Figure 2:
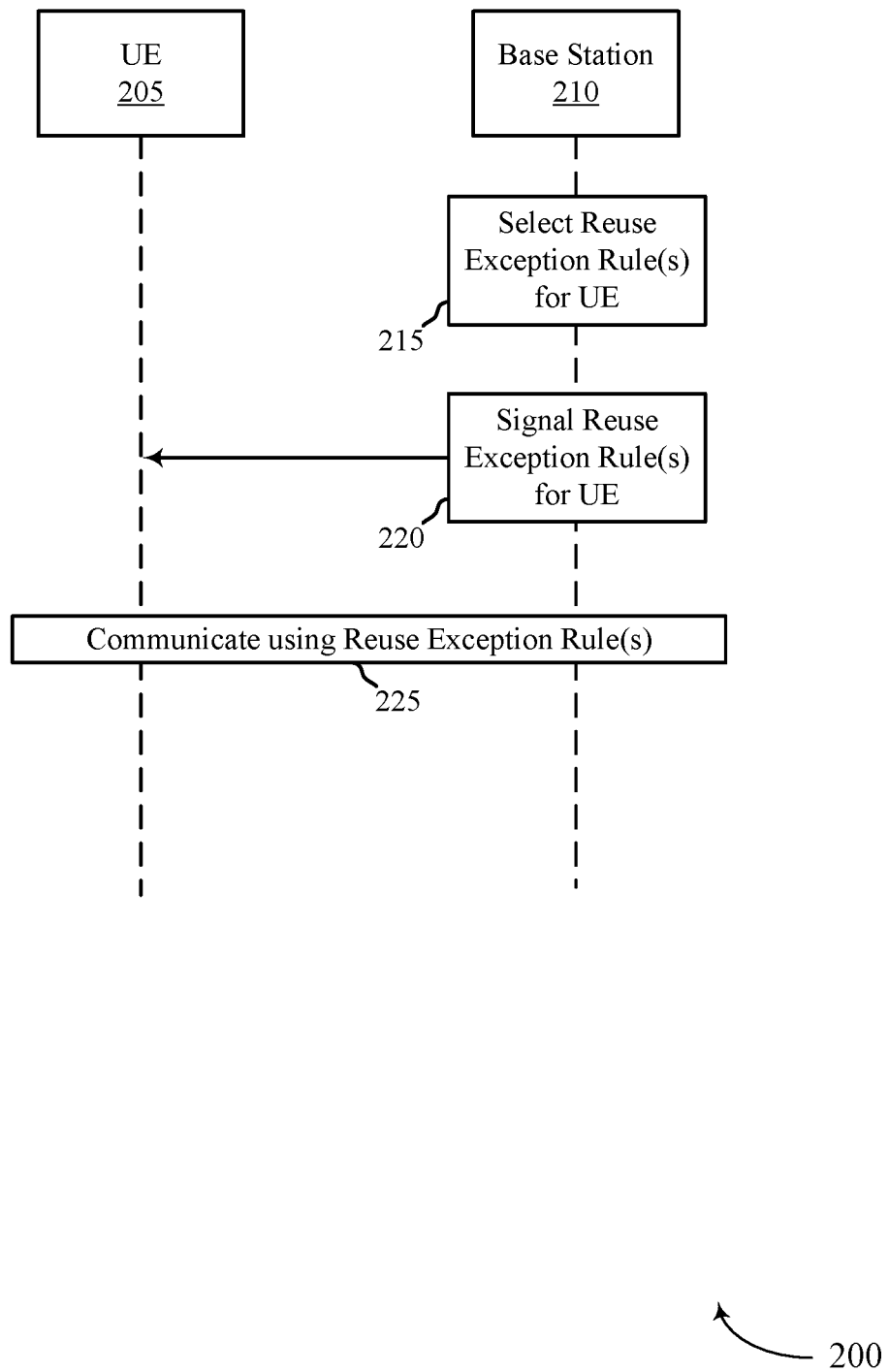
FIG. 2 illustrates an example of a process that supports search space-based reuse exception rules in accordance with aspects of the present disclosure.

FIG. 2 illustrates an example of a process 200 that supports search space-based reuse exception rules in accordance with various aspects of the present disclosure. In some examples, process 200 implement aspects of wireless communication system 100. Process 200 may include a UE 205 and a base station 210, which may be examples of the corresponding device described herein. Broadly, process 200 illustrates one example of a base station selecting and indicating a reuse rule(s) to the UE 205 to be applied for communications between the UE 205 and the base station 210.

Generally, process 200 illustrates one example of defining reuse exception rules for region based reuse. In some aspects, process 200 introduces search space-based (or subsearch space-based) rate matching reuse exception rules. For example, certain regions of a control resource set may be defined and, when unused, available for reuse. The defined regions may be referred to as coresets, in some examples. Base station 210 may select the reuse exception rule(s) for the UE 205 to apply and indicate to the UE 205 the rate matching reuse exception rule(s) based on a search space. In some aspects, the rate matching reuse exception rule based on the search space may include a set of PDCCH decoding candidates (or the corresponding resource elements (REs)) that the UE 205 should assume its PDSCH will not be mapped into even when it is indicated by the L1 signaling that the region is usable for reuse. In some aspects, the decoding candidates in the search space may not be transmitted (in which case the PDSCH reuse may be less optimal), but this is a reasonable cost to pay to have reasonable reuse at low cost with ambiguity. In some aspects, all UEs involved in the reuse know how the reuse exception is defined, e.g., are preconfigured with all reuse exception rules. In aspects of the present disclosure, the definition is indicated to the UE implicitly in that the reuse exception rule is associated with known search spaces.

At 215, the base station 210 may select reuse exception rule(s) for UE 205. The reuse exception rule(s) may be selected so as to be applied by the UE 205 when reusing resource set(s) for data communications. In some aspects, the reuse exception rule(s) may be selected based on a search space, e.g., search space-based reuse exception rule(s). A search space may refer to the resources in a slot assigned or allocated to the UE 205 for finding its PDCCH. That is, the search space may include a set of control channel elements (CCEs) from which the UE 205 may find its PDCCH signal. There may be three types of search space: the common search space, the group common search space, and the UE-specific search space. The common search space may carry the common downlink control information (DCI) that is broadcast to all UEs. The group common search space may carry the common DCI that is broadcast to a group of UEs. The UE-specific search space may carry the DCI for a specific UE, such as UE 205. Each UE may monitor a predetermined search space in a PDCCH region (e.g., control region 315 in FIG. 3) of a downlink slot.

Because 5G NR can support a bandwidth significantly wider than current 3G/4G networks, the control resources (e.g., REs, CCEs) may be partitioned or grouped into different control resource sets. Each control resource set (or coreset) may include one more search spaces as described above. References to a resource set may refer to a control resource set, a portion or subset of a control resource set, or a group of control resource sets. The coresets may be determined based on sub-bands or carriers such that a UE with a limited bandwidth can be assigned to the proper coreset in a bandwidth that can be supported by the UE 205. In some examples, the control resources of a coreset may be located in a sub-band region or a subset of carriers of the entire bandwidth supported by the base station 210. A coreset may be a common coreset, a group common coreset, or a UE-specific coreset. The base station 210 may configure the common coreset for all UEs and optionally one or more group common or UE-specific coresets for different UEs. The common coreset may include the common coreset, group common coresets, and/or UE-specific coresets of one or more UEs. The coresets may be configured and reconfigured by using a RRC signaling configuration or other semi-static procedure. A common coreset may be reconfigured to other frequency(ies), for example, when UEs with different capabilities join and/or leave the network.

When control resources are reallocated for downlink data (e.g., reused), the base station 210 may configure the UE 205 to rate-match the PDSCH based on various rules to utilize the additional resources, such as the described reuse exception rule(s). Generally, rate matching around resources of the resource set may include matching the number of bits in a transport block (TB) or unit to the number of bits that can be transmitted in the given allocation or resources. For example, rate-matching may involve sub-block interleaving, bit collection, pruning, and the like.

Aspects of the present disclosure provide various methods and apparatuses configured to reuse or reallocate unused resources (e.g., downlink control resource sets) for downlink payload data. However, the present disclosure is not limited to the downlink examples described below, the concept may be extended to reuse control resources for uplink data transmission in both FDD and TDD configurations.

Thus, in some examples the base station 210 may select a reuse exception rule that allows the UE 205 to reuse the resource set and rate match around, for data communication, one or more resources of the resource set based on a group common physical downlink control channel (GC-PDCCH) search space (or coreset). In other words, resources of the resource set may be reused for data communication by rate matching based on a GC-PDCCH search space. In some examples, the base station 210 may select a reuse exception rule that allows the UE 205 to reuse the resource set and rate match around, for data communication, one or more resources of the resource set based on a common PDCCH search space (or coreset). In other words, resources of the resource set may be reused for data communication by rate matching based on a common PDCCH search space. In some examples, the base station 210 may select a reuse exception rule that allows the UE 205 to reuse the resource set and rate match around, for data communication, one or more resources of the resource set based on a UE-specific PDCCH search space (or coreset). In other words, resources of the resource set may be reused for data communication by rate matching based on a UE-specific PDCCH search space. The base station 210 may transmit PDCCH signal(s) in the UE-specific PDCCH search space that carry multiple grants for the UE 205. Rate matching around the resources of the resource set for data communication may include, in some examples, the UE 205 matching the number of bits in a TB or unit to the number of bits that can be transmitted in the given allocation or resources. For example, rate-matching may involve sub-block interleaving, bit collection, pruning, and the like.

In some examples, the base station 210 may select a reuse exception rule that allows the UE 205 to reuse the resource set and rate match around, for data communication, one or more resources of the control resource set based on a subset of a UE-specific PDCCH search space. The UE-specific PDCCH search space may be determined based on an aggregation level of the current PDCCH granting the PDSCH for the UE 205. An aggregation level (AL) of a PDCCH transmission may refer to the number of CCEs utilized for the transmission. In some examples, the PDCCH may be transmitted using AL1, AL2, AL4, and/or AL8. For AL1, one CCE may be used to carry the PDCCH. For AL2, two CCEs may be used to carry the PDCCH. For AL 4, four CCEs may be used to carry the PDCCH. For AL8, eight CCEs may be used to carry the PDCCH. In some aspects, the subset of UE-specific PDCCH search space may include decoding candidates having the same AL as the AL of the PDCCH granting the PDSCH for the UE 205. In some aspects, the subset of UE-specific PDCCH search space may include decoding candidates having the same or lower AL as the AL of the PDCCH granting the PDSCH for the UE 205.

At 220, the base station 210 may signal the reuse exception rule(s) to the UE 205. For example, the base station 210 may identify an index associated with each (or a group or subset) of the selected reuse exception rule(s). The UE 205 (and all UEs) may be preconfigured with each possible reuse exception rule, with each reuse exception rule having an associated index that is stored on each device. The base station 210 may communicate an indication of the index to the UE 205 and the UE 205 may access the preconfigured reuse exception rules and use the index to identify which (individually or a group or subset of) reuse exception rule(s) are to be applied by UE 205.

At 225, the UE 205 and the base station 210 may communicate in accordance with the reuse exception rule(s). Communicating in accordance with the reuse exception rule(s) may include the base station 210 transmitting a PDCCH signal in a search space associated with the UE 205 that carries resource grant(s) for the UE 205. The search space that the PDCCH signal is transmitted in may include empty or unused resources that can be reused in accordance with the applicable reuse exception rule(s). The UE 205 may rate match around the resources in the resource set used to carry the grants, e.g., the UE 205 may communicate PDSCH transmissions to base station 210 where the PDSCH transmissions are rate matched with the PDCCH signal carrying the resource grant.

Figure 3:
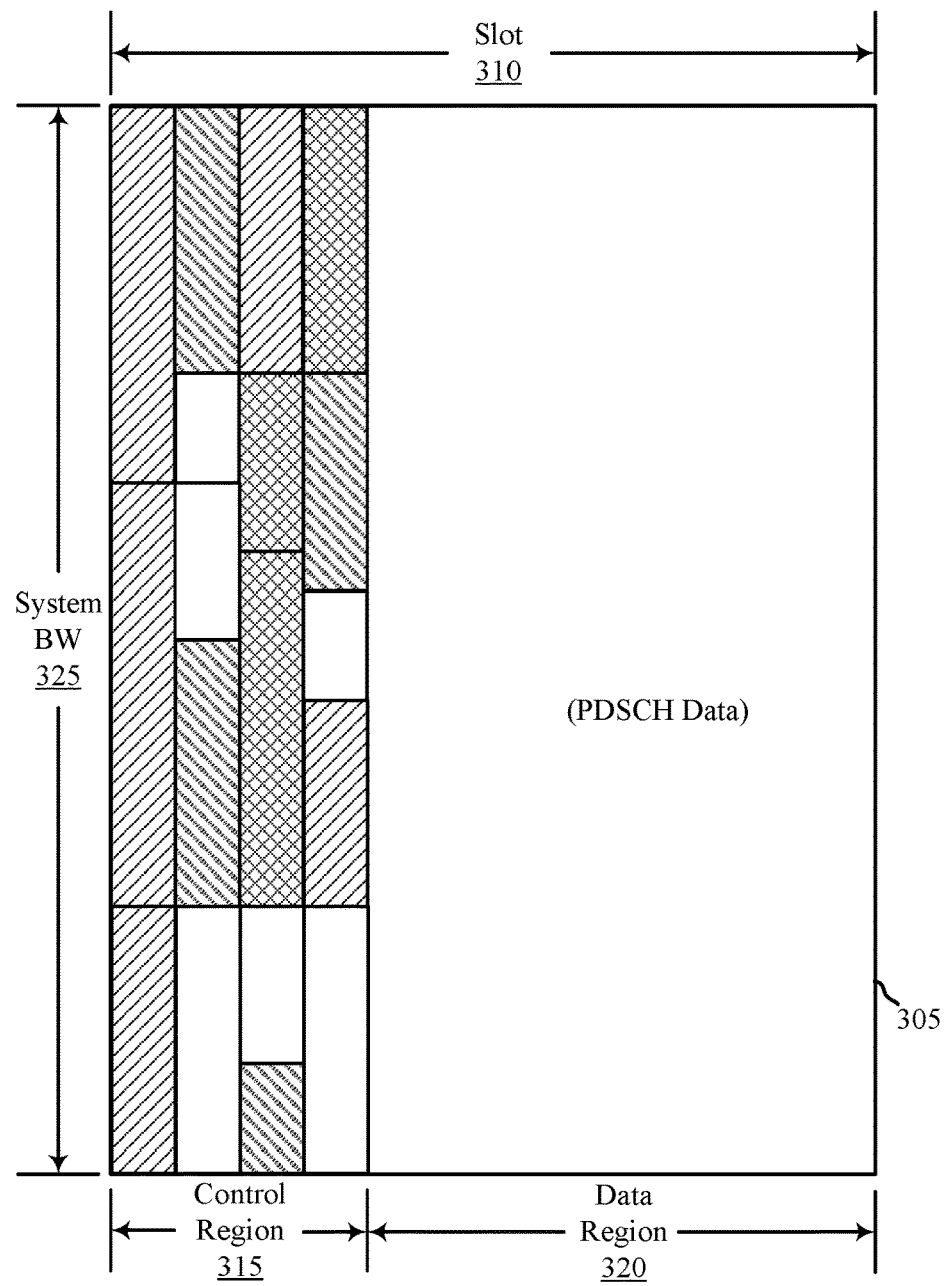
FIG. 3 illustrates an example of a slot configuration that supports search space-based reuse exception rules in accordance with aspects of the present disclosure.

FIG. 3 illustrates an example of a slot configuration 300 that supports search space-based reuse exception rules in accordance with various aspects of the present disclosure. In some examples, slot configuration 300 may implement aspects of wireless communication system 100 and/or process 200. Aspects of slot configuration 300 may be implemented by a UE and/or a base station, which may be examples of the corresponding device described herein. Broadly, slot configuration 300 illustrates one example of a base station selecting and indicating reuse rule(s) to the UE to be applied for communications between the UE and the base station.

Slot configuration 300 may include one physical resource block (PRB) 305 spanning one slot 310. The slot 310 may consist of a number of REs in the time domain and a number of carriers in the frequency domain. The slot 310 may be divided into a control region 315 and a data region 320. The control region 315 may be subdivided into search spaces. The control region 315 may be used to carry or otherwise convey control information to UE(s) operating within the coverage area of a base station. Examples of the configurable search spaces include a common search space 330, a group common search space 335, a UE-specific search space 340, and unused control resources 345. The data region 320 may carry PDSCH transmissions scheduled for UEs.

The number of subcarriers (or tones or frequencies) occupying the slot 310 may establish the system bandwidth 325. In one example, the system bandwidth 325 may include 12 subcarriers, or some other number of subcarriers. As discussed above, an intersection of one subcarrier occurring during one symbol period may constitute a RE and the control information may be carried in one or more CCEs (e.g., REs forming resource element groups (REGs) and REGs forming CCE(s)). One or more CCEs may be assigned to a search space of one or more UEs, and the UE can find its PDCCH in the assigned CCEs. In some aspects, the UE may be configured to support the full system bandwidth (e.g., system bandwidth 325) or may be configured to support a subset of the full system bandwidth.

The number of CCEs available for carrying the PDCCH may be variable depending on the number of OFDM symbols used, the bandwidth of the system, and/or a number of antenna ports present at the base station. In some examples, consecutive CCEs may be mapped into REGs that are distributed (i.e., non-consecutive) in frequency. Consecutive CCEs may refer to CCEs that are consecutive in their numbering or ordering in the logical space. Two REGs are not consecutive when they are not adjacent to each other (separated by one or more REs). This may be referred to as distributed CCE-to-REG mapping. In some examples, consecutive CCEs are mapped to REGs that are consecutive in frequency. This may be referred to as localized CCE-to-REG mapping. For example, consecutive or adjacent REGs are not separated from each other by one or more REs.

The general principals of CCE-to-REG mapping for coresets (or search spaces) are agreed. For example, in a single symbol operation, only a frequency first mapping is used. This implies a REG bundle of size 2, 3, or 6 (may down select) in frequency domain. When a two symbols operation is defined, a time first mapping may be used. This implies at least that a REG bundle of size 3 in frequency domain may be supported. When a three symbols operation is defined, a time first mapping is also used, which implies at least that a REG bundle of size 2 in frequency domain may be supported. Thus, it is to be understood that the particular mapping/arrangement of CCE(s) into search spaces may vary and the slot configuration 300 illustrated in FIG. 3 is one example only. That is, there may be more or fewer common search spaces 330, group common search spaces 335, UE-specific search spaces 340, and/or unused control resources 345, and each search space may have a different size and/or arrangement than is illustrated in slot configuration 300.

In some scenarios, some control resources of the downlink control region 315 may be reused by the downlink data portion 320 for carrying downlink data. This situation may occur when the downlink control region has more than sufficient resources to transmit the downlink control information (e.g., PDCCH) in the slot 310.

The resources of the downlink control region may be reused or reallocated to the downlink data portion using different methods. A time-domain only method expands the downlink data portion in the time domain only with respect to the PDSCH. That is, the base station can inform the UE of the starting symbol position of its PDSCH in the time domain. For example, if the PDSCH originally is scheduled to start at symbol 3 of a slot, the expanded PDSCH can start at symbol 1 or 2 that is originally scheduled for the downlink control portion.

In another method, the base station may inform the UE of the time and frequency locations of the resources that can be reallocated to the downlink data portion. This method allows the resources to be identified independent of the PDSCH. For example, in the time domain, the base station may indicate the starting symbol position only, or both starting and ending symbol positions. In the frequency domain, the scheduling entity may indicate the starting and ending frequencies or reused CCE(s) corresponding to the reallocated control resources.

When control resources are reallocated for downlink data, the base station may configure the UE to rate-match the PDSCH based on various rules to utilize the additional resources. The function of rate matching is to match the number of bits in TB or unit to the number of bits that can be transmitted in the given allocation or resources. For example, rate-matching may involve sub-block interleaving, bit collection, and pruning.

In some reuse scenarios, the scheduling entity can configure a UE to rate-match its PDSCH outside the search spaces. In one example, the base station ensures not to configure or reallocate REs that overlap with the search spaces of other UEs. Then, the UE rate-matches its PDSCH around or outside the search space. In another example, the base station informs the UE about the UE-specific search spaces 340 of other UEs, then the UE can rate-match its PDSCH around or outside all the informed search spaces.

In another reuse scenario, the UE may rate-match its PDSCH outside the configured search spaces. In one example, the scheduling entity ensures not to configure or reallocate resource elements that overlap with the UE-specific search spaces of other UEs, then the subject UE can rate-match around or outside the common search space 330 and its own group specific search space 335 and/or UE-specific search space 340 (if configured). In case that wideband reference signal is used for the common search space, the UE may rate-match around all the wideband reference signals in the common search space 330. In another example, the base station may inform a UE about the UE-specific search space 340 of other UEs, then the UE can rate-match around or outside all the informed search spaces.

In another reuse scenario, the UE can rate-match its PDSCH around all the decoded PDCCHs. In one example, the base station ensures not to configure resource elements that overlap with other UE's PDCCHs.

In some reuse scenarios, the base station may transmit an indicator (e.g., an index) in the downlink control portion to inform a UE how the reallocated control resources are to be used in the downlink data portion or PDSCH. For example, the base station may transmit an indicator to provide a predetermined or selected rule in the DCI or via RRC or other semi-static signaling. For example, this rule informs the UE how to rate-match the PDSCH to utilize the reallocated control resources based on the search space. The base station may also transmit an indicator to provide a predetermined or selected resource reuse type in the DCI or via RRC or other semi-static signaling. The resource reuse type may be the same as the time-domain only expansion with respect to the PDSCH, or time and frequency domain expansion independent of the PDSCH, and the like.

Thus, a base station may select a reuse exception rule(s) to be applied by a UE when reusing resource set(s) for data communication. The reuse exception rule(s) may be selected based on a search space associated with the UE, e.g., a common search space 330, a group common search space 335, and/or a UE-specific search space 340. The base station may send an indication to the UE of the selected reuse exception rule(s) and then the base station and UE may communicate according to the reuse exception rule(s), e.g., using the reuse scenarios described above. Any of the described search spaces may have sufficient REs that are unused (e.g., the PDCCH signal does not occupy the full search space) to schedule and perform the communications using the unused resources of the resource set.

In some aspects, the unused control resources 345 may be reused in accordance with signaling from the base station. For example, the base station may use L1 signaling to schedule the resources in the unused control resources 345 for reuse for data communications.

In one example of a reuse exception rule, the search space is composed of one single decoding candidate that carries the group common search space 335. This may be useful when the group common search space 335 is configured to be transmitted, e.g., the PDCCH signal is configured to be transmitted in the group common search space 335. In the situation where the group common PDCCH is not transmitted in slot 310, the rate matching loss in this instance may be one DCI. In some aspect, this scenario is helpful when all the coreset is empty except the group common search space 335. This rule can be combined with other rules such as the reuse exception rules where the PDCCH schedules the PDSCH.

In another example of a reuse exception rule, the search space can be a common search space 330. The UE may monitor the common search space 330 (e.g., the common search space 330 is common to all UEs). All UEs know the common search space 330 composition, i.e., no additional signaling is needed to define it for rate matching. From the base station perspective, the base station may bias towards using the common search space 330 whenever it can to avoid using the UE-specific search space 340 to improve reuse efficiency. This rule may be useful when the base station can try to put all the grants in the common search space 330.

In another example of a reuse exception rule, the reuse exception search space is the UE-specific search space 340 that the UE is currently monitoring and detects the PDCCH granting the PDSCH from. This reuse exception rule supports sending the UE multiple DCIs in the same UE-specific search space 340 (e.g., including other downlink grants or uplink grants). Without this rule, if there are additional grants being sent to the same UE, the coreset cannot be reused under conventional reuse exception rules. In some aspects, this rule does not target the most accurate reuse as the entire UE-specific search space 340 is in exception, as there is no mechanism to safely indicate which decoding candidate is used.

In another example of a reuse exception rule, the reuse exception search space is a sub-space of the UE-specific search space 340 that the UE is currently monitoring and detects the PDCCH granting the PDSCH from. The subspace can be defined as the decoding candidates that has the same AL as the current PDCCH granting the PDSCH. In some aspects, this rule rules out all other decoding candidates covered by these if a nested decoding candidate structure is introduced. The base station may not need to use a mixed AL to grant UEs, so likely other grants will have the same AL. This is a slightly more efficient rule, but with a small loss in flexibility. The UE knows the AL for the current PDCCH, and can rate match around all decoding candidates of the same AL.

Figure 4:
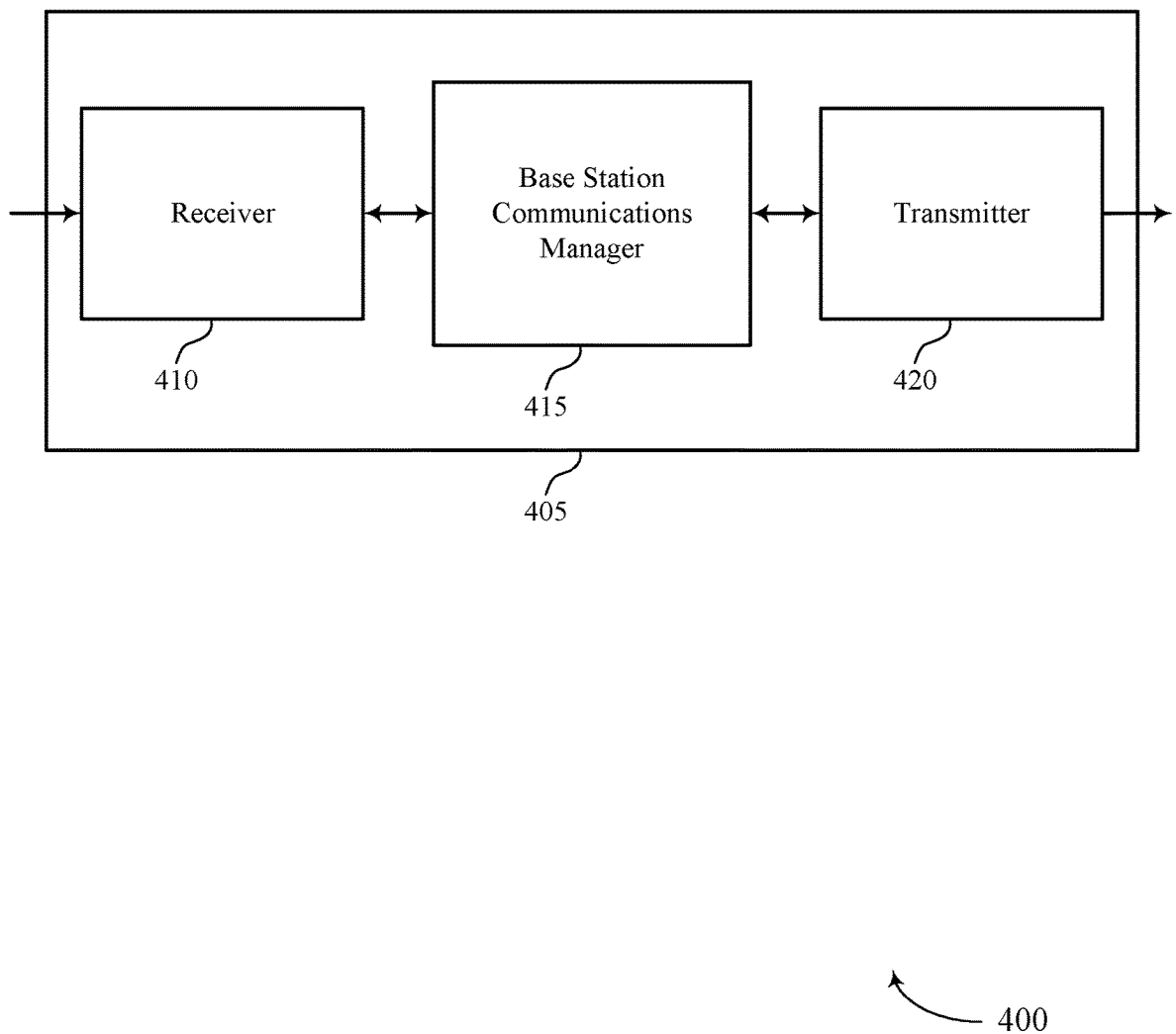
FIGS. 4 through 6 show block diagrams of a device that supports search space-based reuse exception rules in accordance with aspects of the present disclosure.

FIG. 4 shows a block diagram 400 of a wireless device 405 that supports search space-based reuse exception rules in accordance with aspects of the present disclosure. Wireless device 405 may be an example of aspects of a base station 105 as described herein. Wireless device 405 may include receiver 410, base station communications manager 415, and transmitter 420. Wireless device 405 may also include a processor. Each of these components may be in communication with one another (e.g., via one or more buses).

Receiver 410 may receive information such as packets, user data, or control information associated with various information channels (e.g., control channels, data channels, and information related to search space-based reuse exception rules, etc.). Information may be passed on to other components of the device. The receiver 410 may be an example of aspects of the transceiver 735 described with reference to FIG. 7. The receiver 410 may utilize a single antenna or a set of antennas.

Base station communications manager 415 may be an example of aspects of the base station communications manager 715 described with reference to FIG. 7.

Base station communications manager 415 and/or at least some of its various sub-components may be implemented in hardware, software executed by a processor, firmware, or any combination thereof. If implemented in software executed by a processor, the functions of the base station communications manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 415 and/or at least some of its various sub-components may be physically located at various positions, including being distributed such that portions of functions are implemented at different physical locations by one or more physical devices. In some examples, base station communications manager 415 and/or at least some of its various sub-components may be a separate and distinct component in accordance with various aspects of the present disclosure. In other examples, base station communications manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 415 may select, for a UE, one or more reuse exception rules to be applied by the UE when reusing one or more resource sets for data communication, signal the one or more reuse exception rules to the UE, and communicate with the UE in accordance with the one or more reuse exception rules.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Figure 5:
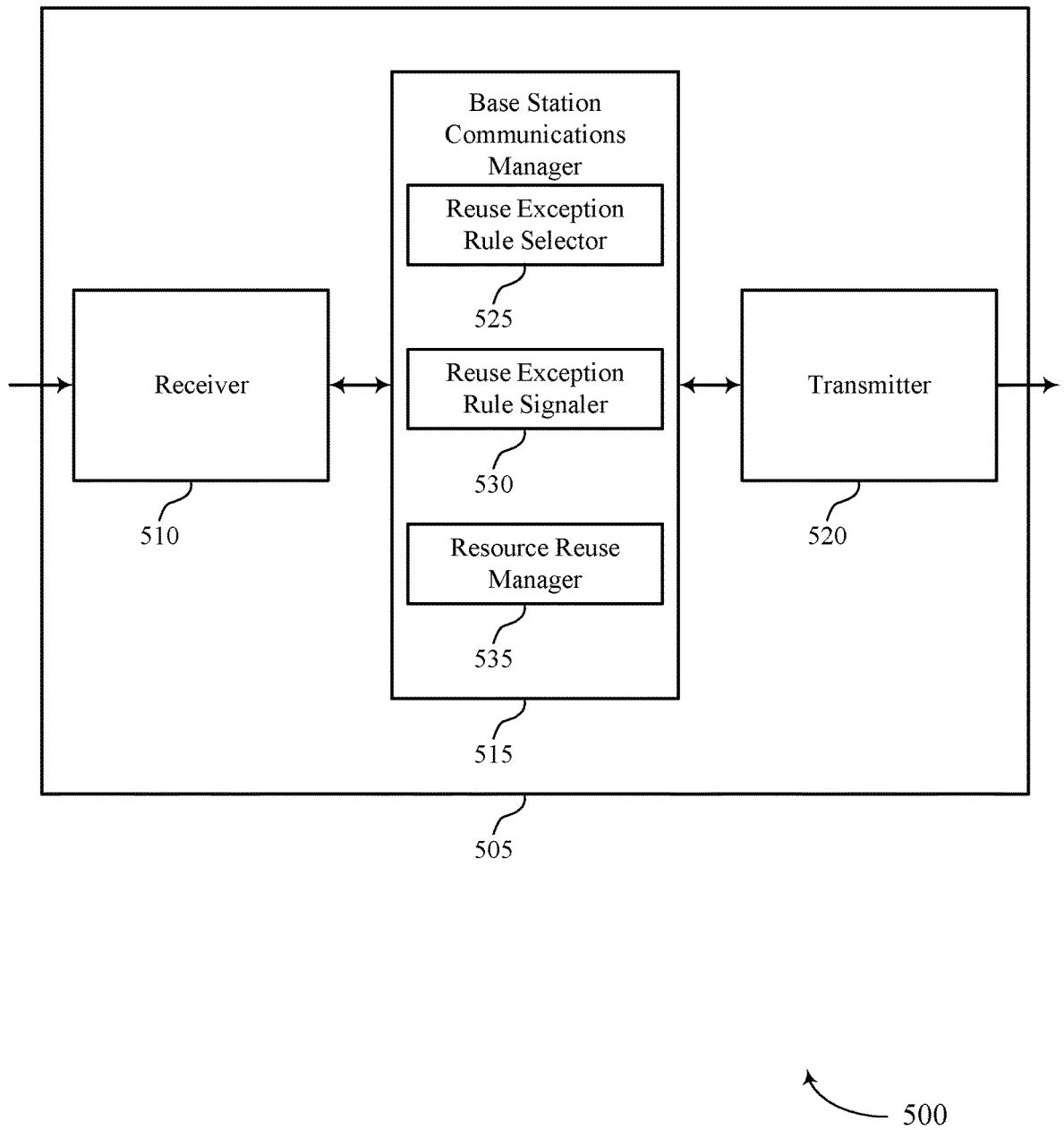

FIG. 5 shows a block diagram 500 of a wireless device 505 that supports search space-based reuse exception rules in accordance with aspects of the present disclosure. Wireless device 505 may be an example of aspects of a wireless device 405 or a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to search space-based reuse exception rules, etc.). Information may be passed on to other components of the device. The receiver 510 may be an example of aspects of the transceiver 735 described with reference to FIG. 7. The receiver 510 may utilize a single antenna or a set of antennas.

Base station communications manager 515 may be an example of aspects of the base station communications manager 715 described with reference to FIG. 7.

Base station communications manager 515 may also include reuse exception rule selector 525, reuse exception rule signaler 530, and resource reuse manager 535.

Reuse exception rule selector 525 may select, for a UE, one or more reuse exception rules to be applied by the UE when reusing one or more resource sets for data communication. In some cases, the resource set includes a control resource set, or a set of control resource sets, or a subset of resources of a control resource set, or any combinations thereof.

Reuse exception rule signaler 530 may signal the one or more reuse exception rules to the UE.

Resource reuse manager 535 may communicate with the UE in accordance with the one or more reuse exception rules.

Transmitter 520 may transmit signals generated by other components of the device. In some examples, the transmitter 520 may be collocated with a receiver 510 in a transceiver module. For example, the transmitter 520 may be an example of aspects of the transceiver 735 described with reference to FIG. 7. The transmitter 520 may utilize a single antenna or a set of antennas.

Figure 6:
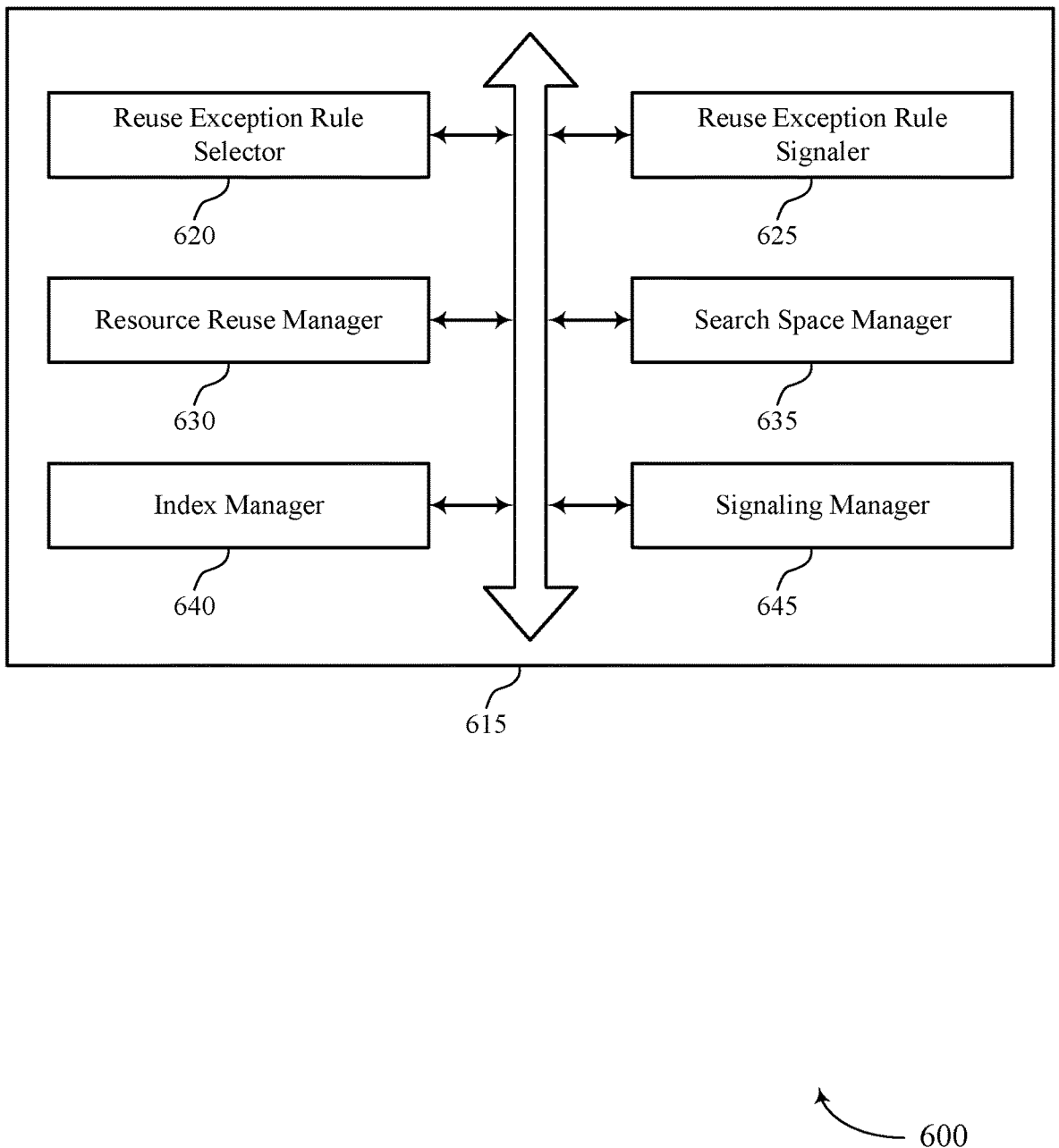

FIG. 6 shows a block diagram 600 of a base station communications manager 615 that supports search space-based reuse exception rules in accordance with aspects of the present disclosure. The base station communications manager 615 may be an example of aspects of a base station communications manager 415, a base station communications manager 515, or a base station communications manager 715 described with reference to FIGS. 4, 5, and 7. The base station communications manager 615 may include reuse exception rule selector 620, reuse exception rule signaler 625, resource reuse manager 630, search space manager 635, index manager 640, and signaling manager 645. Each of these modules may communicate, directly or indirectly, with one another (e.g., via one or more buses).

Reuse exception rule selector 620 may select, for a UE, one or more reuse exception rules to be applied by the UE when reusing one or more resource sets for data communication. In some cases, the resource set includes a control resource set, or a set of control resource sets, or a subset of resources of a control resource set, or any combinations thereof. In some cases, selecting the one or more reuse exception rules includes: selecting the one or more reuse exception rules to be applied by the UE from a set of search space-based rate matching reuse exception rules. In some cases, selecting the one or more reuse exception rules includes: selecting a reuse exception rule that allows the UE to reuse the resource set and rate match around, for data communication, one or more resources of the resource set based on a GC-PDCCH search space. In some cases, selecting the one or more reuse exception rules includes: selecting a reuse exception rule that allows the UE to reuse the resource set and rate match around, for data communication, one or more resources of the resource set based on a common PDCCH search space. In some cases, selecting the one or more reuse exception rules includes: selecting a reuse exception rule that allows the UE to reuse the resource set and rate match around, for data communication, one or more resources of the resource set based on a UE-specific PDCCH search space. In some cases, selecting the one or more reuse exception rules includes: selecting a reuse exception rule that allows the UE to reuse the resource set and rate match around, for data communication, one or more resources of the control resource set based on a subset of a UE-specific PDCCH search space.

Reuse exception rule signaler 625 may signal the one or more reuse exception rules to the UE.

Resource reuse manager 630 may communicate with the UE in accordance with the one or more reuse exception rules.

Search space manager 635 may transmit, in the UE-specific PDCCH search space, one or more PDCCH signals including a set of resource grants for the UE and transmit, in a search space associated with the UE, one or more PDCCH signals including one or more resource grants for the UE. In some cases, the UE-specific PDCCH search space is determined by an AL of a current PDCCH granting a PDSCH to the UE. In some cases, the subset of UE-specific PDCCH search space includes one or more decoding candidates having the same AL as the AL of the current PDCCH granting the PDSCH to the UE. In some cases, the subset of UE-specific PDCCH search space includes one or more decoding candidates having the same or lower AL as the AL of the current PDCCH granting the PDSCH to the UE.

Index manager 640 may communicate an indication of the index to the UE. In some cases, signaling the one or more reuse exception rules to the UE includes: identifying an index associated with each of the one or more reuse exception rules. In some cases, signaling the one or more reuse exception rules to the UE includes: identifying an index associated with a subset of rules of the one or more reuse exception rules.

Signaling manager 645 may transmit RRC signaling to configure the resource set and transmit L1 signaling to indicate resource set reuse.

Figure 7:
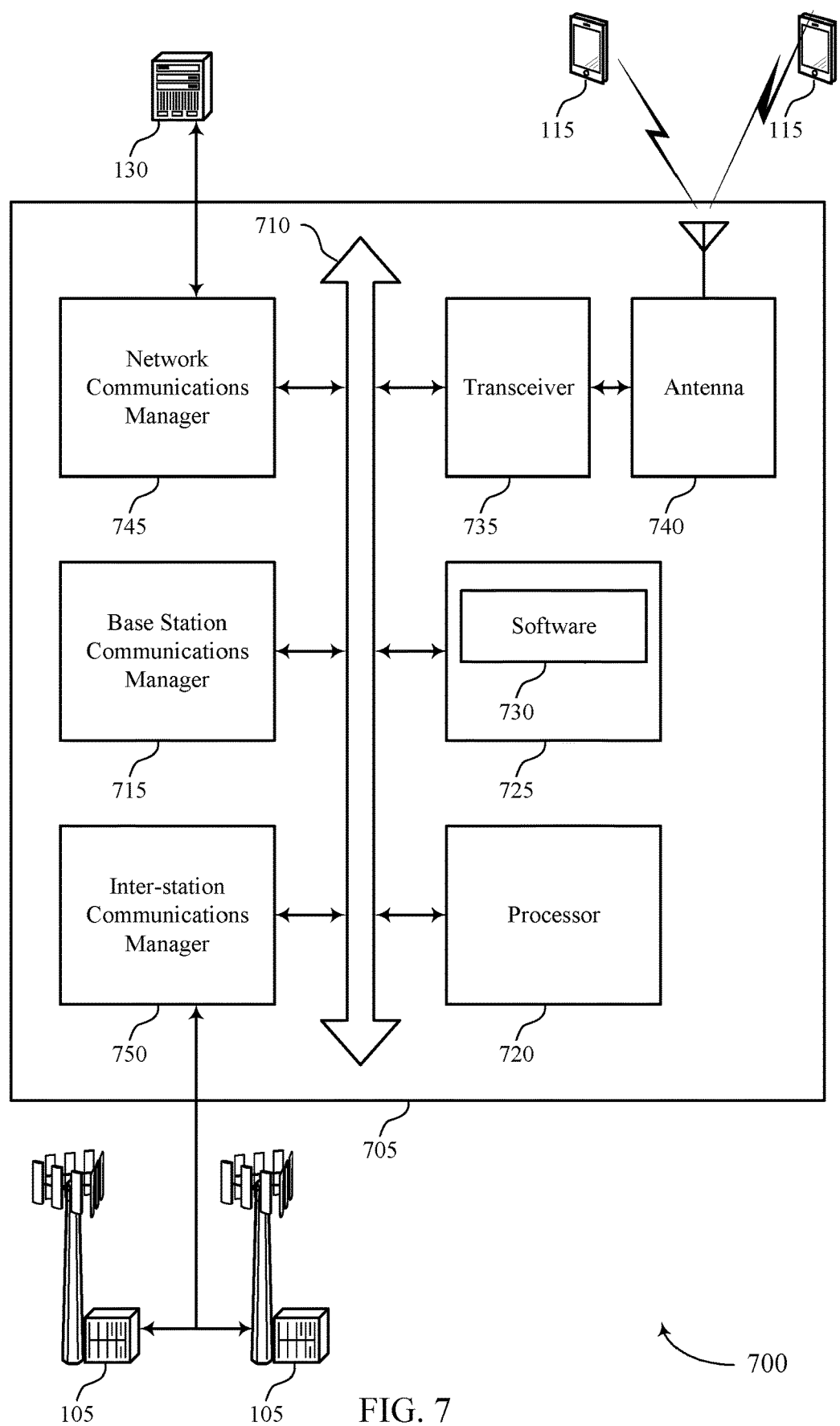
FIG. 7 illustrates a block diagram of a system including a base station that supports search space-based reuse exception rules in accordance with aspects of the present disclosure.

FIG. 7 shows a diagram of a system 700 including a device 705 that supports search space-based reuse exception rules in accordance with aspects of the present disclosure. Device 705 may be an example of or include the components of wireless device 405, wireless device 505, or a base station 105 as described herein. Device 705 may include components for bi-directional voice and data communications including components for transmitting and receiving communications, including base station communications manager 715, processor 720, memory 725, software 730, transceiver 735, antenna 740, network communications manager 745, and inter-station communications manager 750. These components may be in electronic communication via one or more buses (e.g., bus 710). Device 705 may communicate wirelessly with one or more UEs 115.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting search space-based reuse exception rules).

Memory 725 may include random access memory (RAM) and read only memory (ROM). The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support search space-based reuse exception rules. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

In some cases, the wireless device may include a single antenna 740. However, in some cases the device may have more than one antenna 740, which may be capable of concurrently transmitting or receiving multiple wireless transmissions.

Network communications manager 745 may manage communications with the core network (e.g., via one or more wired backhaul links). For example, the network communications manager 745 may manage the transfer of data communications for client devices, such as one or more UEs 115.

Inter-station communications manager 750 may manage communications with other base station 105, and may include a controller or scheduler for controlling communications with UEs 115 in cooperation with other base stations 105. For example, the inter-station communications manager 750 may coordinate scheduling for transmissions to UEs 115 for various interference mitigation techniques such as beamforming or joint transmission. In some examples, inter-station communications manager 750 may provide an X2 interface within an LTE/LTE-A wireless communication network technology to provide communication between base stations 105.

Figure 8:
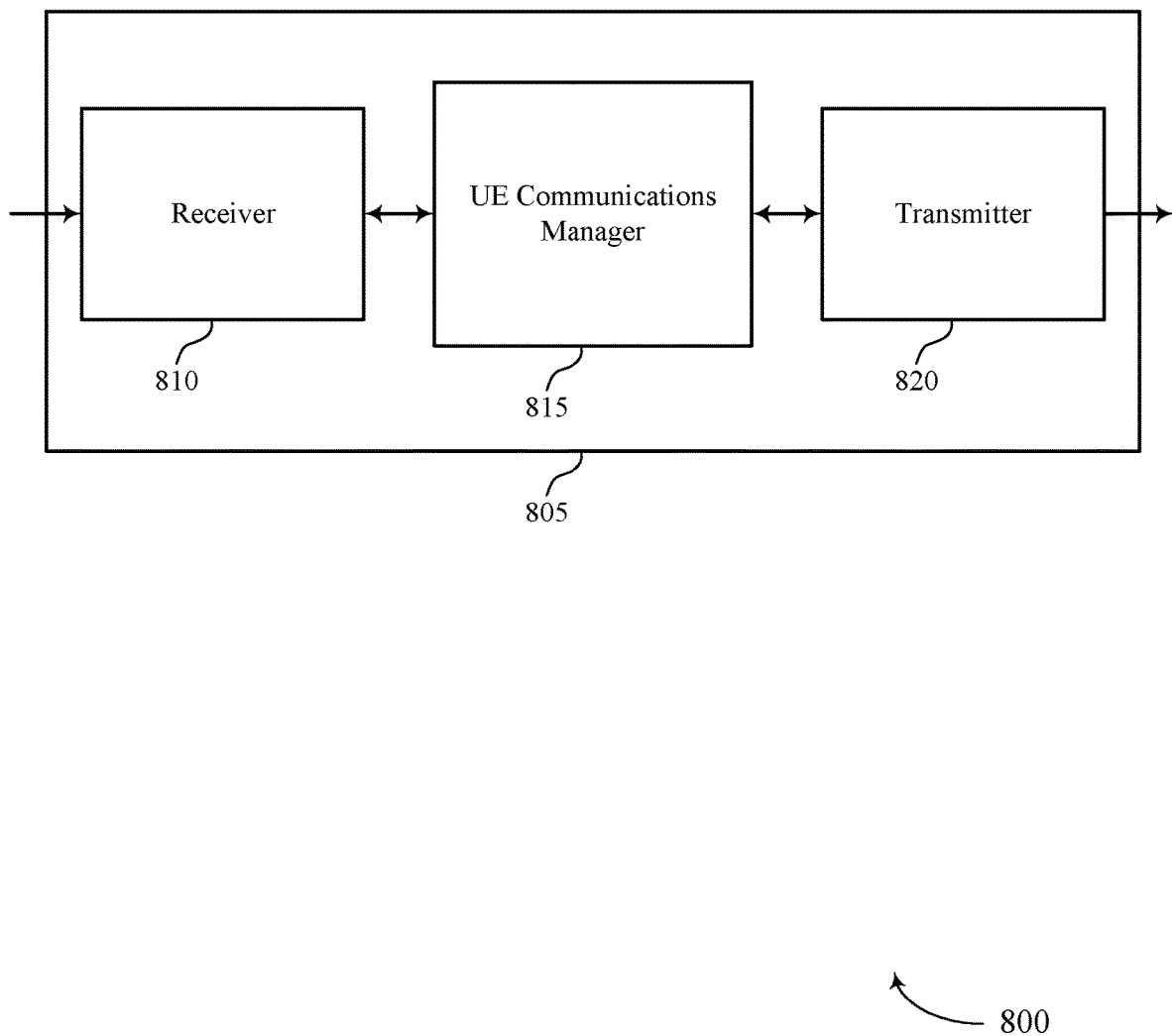
FIGS. 8 through 10 show block diagrams of a device that supports search space-based reuse exception rules in accordance with aspects of the present disclosure.

FIG. 8 shows a block diagram 800 of a wireless device 805 that supports search space-based reuse exception rules in accordance with aspects of the present disclosure. Wireless device 805 may be an example of aspects of a UE 115 as described herein. Wireless device 805 may include receiver 810, UE communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to search space-based reuse exception rules, etc.). Information may be passed on to other components of the device. The receiver 810 may be an example of aspects of the transceiver 1135 described with reference to FIG. 11. The receiver 810 may utilize a single antenna or a set of antennas.

UE communications manager 815 may be an example of aspects of the UE communications manager 1115 described with reference to FIG. 11.

UE communications manager 815 and/or at least some of its various sub-components may be implemented in hardware, software executed by a processor, firmware, or any combination thereof. If implemented in software executed by a processor, the functions of the UE communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 815 and/or at least some of its various sub-components may be physically located at various positions, including being distributed such that portions of functions are implemented at different physical locations by one or more physical devices. In some examples, UE communications manager 815 and/or at least some of its various sub-components may be a separate and distinct component in accordance with various aspects of the present disclosure. In other examples, UE communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 815 may receive a signal from a base station identifying one or more reuse exception rules to be applied by the UE for reusing one or more resource sets for data communication and communicate with the base station in accordance with the one or more reuse exception rules.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
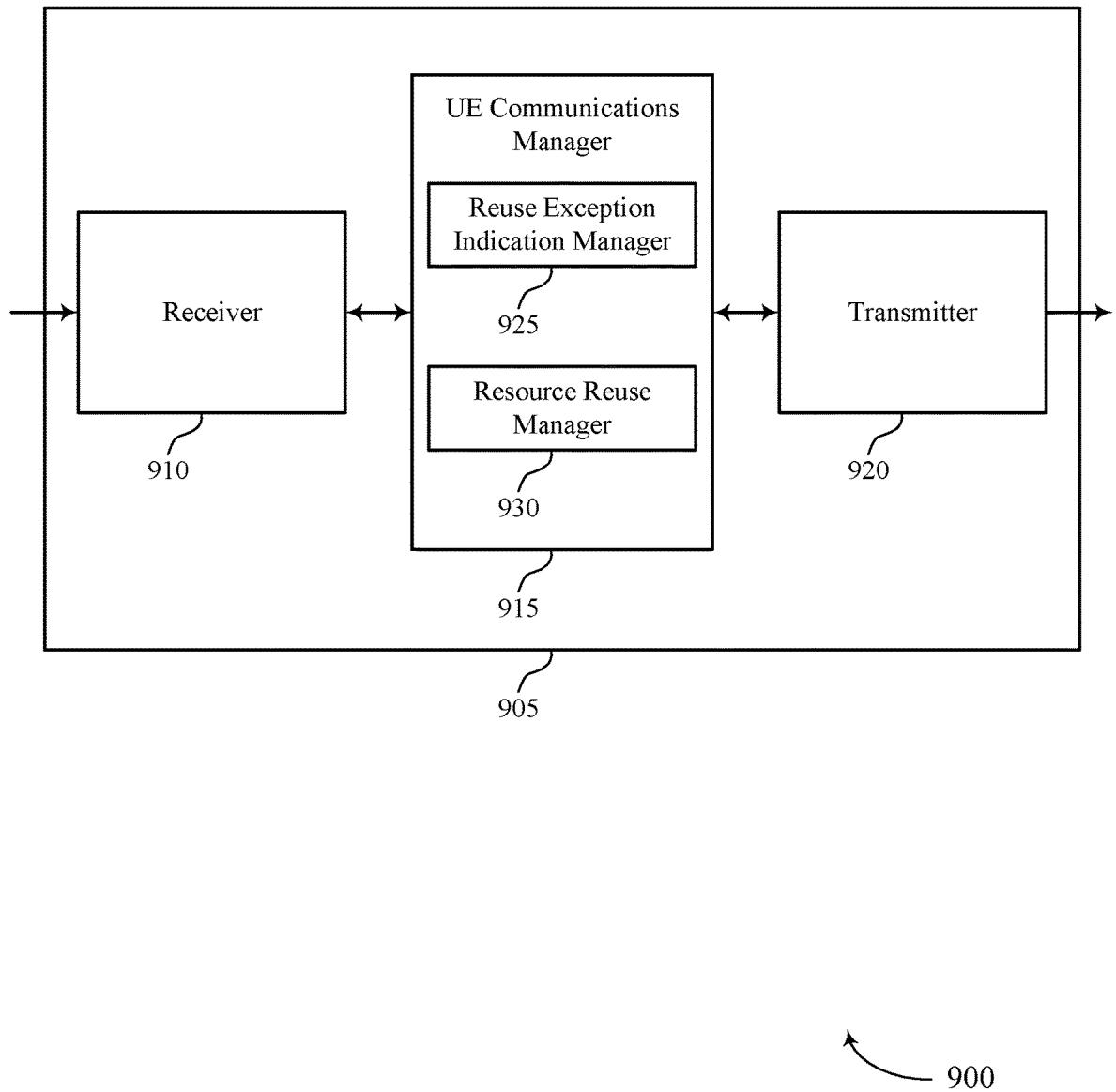

FIG. 9 shows a block diagram 900 of a wireless device 905 that supports search space-based reuse exception rules in accordance with aspects of the present disclosure. Wireless device 905 may be an example of aspects of a wireless device 805 or a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to search space-based reuse exception rules, etc.). Information may be passed on to other components of the device. The receiver 910 may be an example of aspects of the transceiver 1135 described with reference to FIG. 11. The receiver 910 may utilize a single antenna or a set of antennas.

UE communications manager 915 may be an example of aspects of the UE communications manager 1115 described with reference to FIG. 11. UE communications manager 915 may also include reuse exception indication manager 925 and resource reuse manager 930.

Reuse exception indication manager 925 may receive a signal from a base station identifying one or more reuse exception rules to be applied by the UE for reusing one or more resource sets for data communication.

Resource reuse manager 930 may communicate with the base station in accordance with the one or more reuse exception rules.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
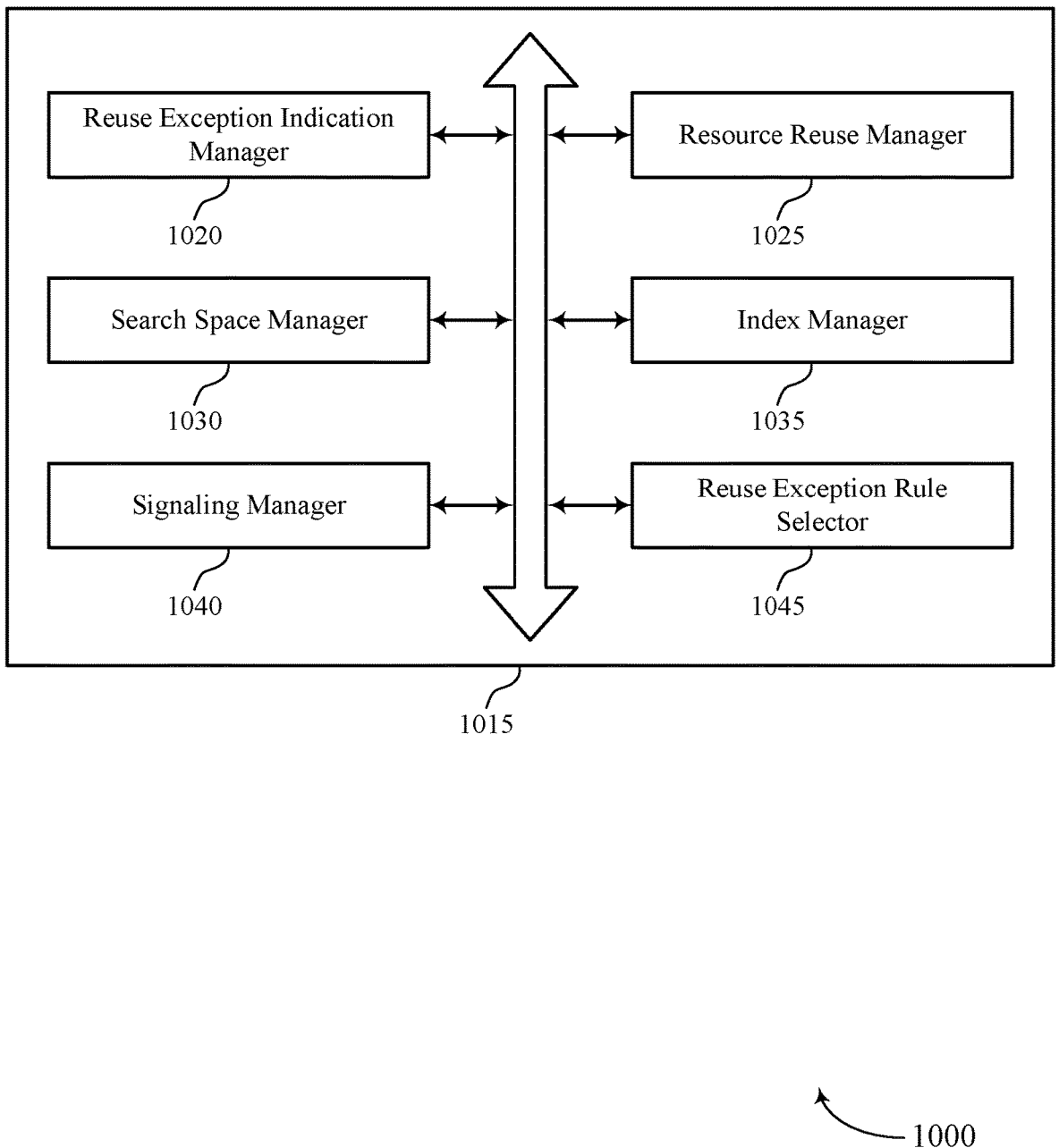

FIG. 10 shows a block diagram 1000 of a UE communications manager 1015 that supports search space-based reuse exception rules in accordance with aspects of the present disclosure. The UE communications manager 1015 may be an example of aspects of a UE communications manager 1115 described with reference to FIGS. 8, 9, and 11. The UE communications manager 1015 may include reuse exception indication manager 1020, resource reuse manager 1025, search space manager 1030, index manager 1035, signaling manager 1040, and reuse exception rule selector 1045. Each of these modules may communicate, directly or indirectly, with one another (e.g., via one or more buses).

Reuse exception indication manager 1020 may receive a signal from a base station identifying one or more reuse exception rules to be applied by the UE for reusing one or more resource sets for data communication. In some cases, the one or more reuse exception rules signaled to the UE are search space-based rate matching reuse exception rules.

Resource reuse manager 1025 may communicate with the base station in accordance with the one or more reuse exception rules.

Search space manager 1030 may receive, in a search space associated with the UE, one or more PDCCH signals including one or more resource grants for the UE, and apply a reuse exception rule of the one or more reuse exception rules that allows the UE to reuse the resource set and rate match around, for data communication, one or more resources of the resource set based on a search space. In some examples, the search space manager 1030 may identify a GC-PDCCH search space associated with the UE, and apply a reuse exception rule that allows the UE to reuse the resource set and rate match around, for data communication, one or more resources of the resource set based on the GC-PDCCH search space. In other examples, the search space manager 1030 may identify a common PDCCH search space associated with the UE, and apply a reuse exception rule of the one or more reuse exception rules that allows the UE to reuse the resource set and rate match around, for data communication, one or more resources of the resource set based on the common PDCCH search space. In still other examples, the search space manager 1030 may identify a UE-specific PDCCH search space associated with the UE, and apply a reuse exception rule of the one or more reuse exception rules that allows the UE to reuse the resource set and rate match around, for data communication, one or more resources of the resource set based on the UE-specific PDCCH search space. In some aspects, the search space manager 1030 may identify a subset of a UE-specific PDCCH search space associated with the UE, and apply a reuse exception rule of the one or more reuse exception rules that allows the UE to reuse the resource set and rate match, for data communication, one or more resources of the resource set based on the subset of the UE-specific PDCCH search space. The search space manager 1030 may receive, in the UE-specific PDCCH search space, one or more PDCCH signals including a set of resource grants for the UE. In some cases, the UE-specific PDCCH search space is determined by an AL of a current PDCCH granting a PDSCH to the UE. In some cases, the subset of UE-specific PDCCH search space includes one or more decoding candidates having the same AL as the AL of the current PDCCH granting the PDSCH to the UE. In some cases, the subset of UE-specific PDCCH search space includes one or more decoding candidates having the same or lower AL as the AL of the current PDCCH granting the PDSCH to the UE.

Index manager 1035 may receive an indication of an index associated with each of the one or more reuse exception rules, identify the one or more reuse exception rules based on the indication, and receive an indication of an index associated with a subset of rules of the one or more reuse exception rules.

Signaling manager 1040 may receive RRC signaling configuring the resource sets and receive L1 signaling indicating resource set reuse.

Reuse exception rule selector 1045 may manage aspects of the resource set including a control resource set, or a set of control resource sets, or a subset of resources of a control resource set, or any combinations thereof.

Figure 11:
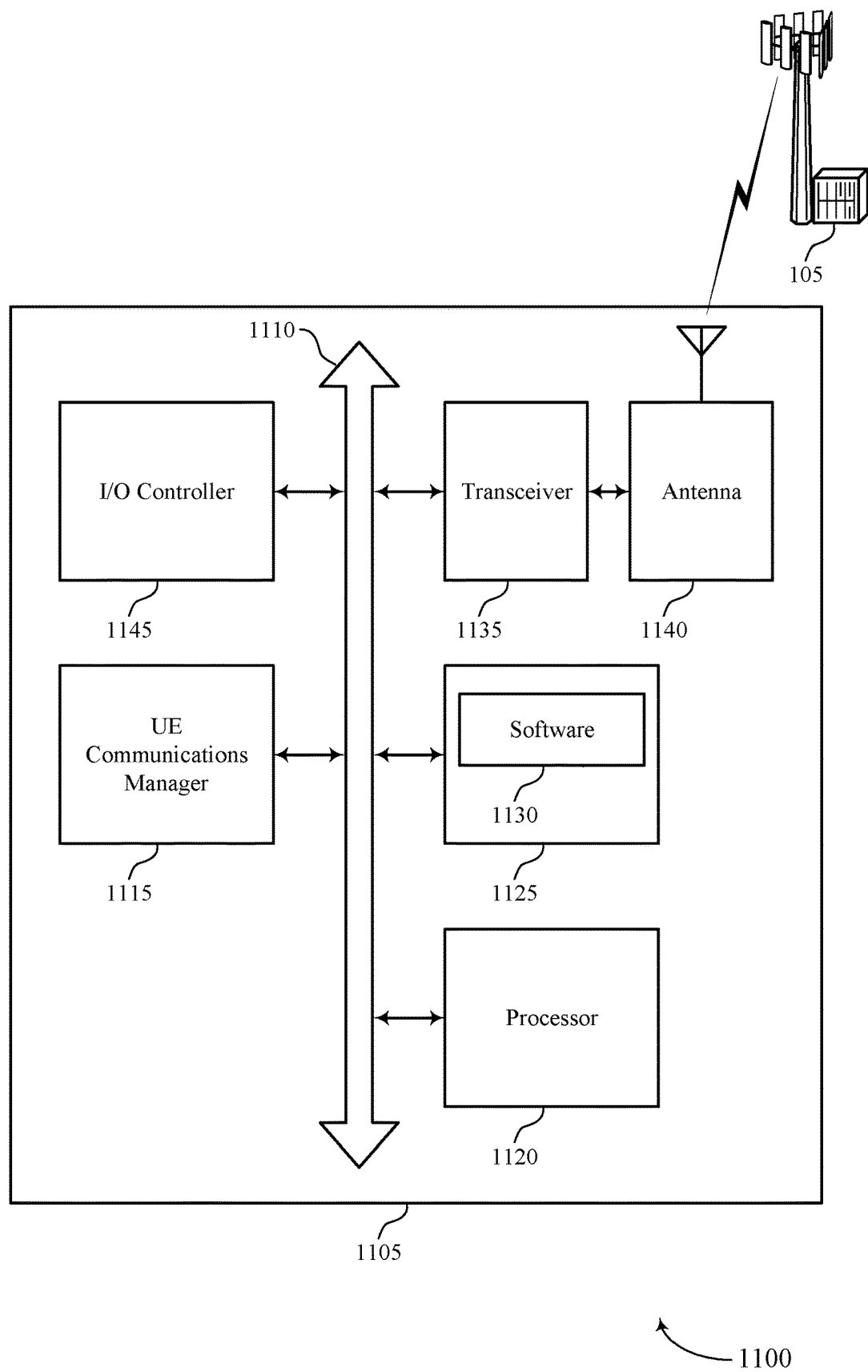
FIG. 11 illustrates a block diagram of a system including a user equipment (UE) that supports search space-based reuse exception rules in accordance with aspects of the present disclosure.

FIG. 11 shows a diagram of a system 1100 including a device 1105 that supports search space-based reuse exception rules in accordance with aspects of the present disclosure. Device 1105 may be an example of or include the components of UE 115 as described herein. Device 1105 may include components for bi-directional voice and data communications including components for transmitting and receiving communications, including UE communications manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting search space-based reuse exception rules).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware or software operation such as the interaction with peripheral components or devices.

Software 1130 may include code to implement aspects of the present disclosure, including code to support search space-based reuse exception rules. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be implemented as part of a processor. In some cases, a user may interact with device 1105 via I/O controller 1145 or via hardware components controlled by I/O controller 1145.

Figure 12:
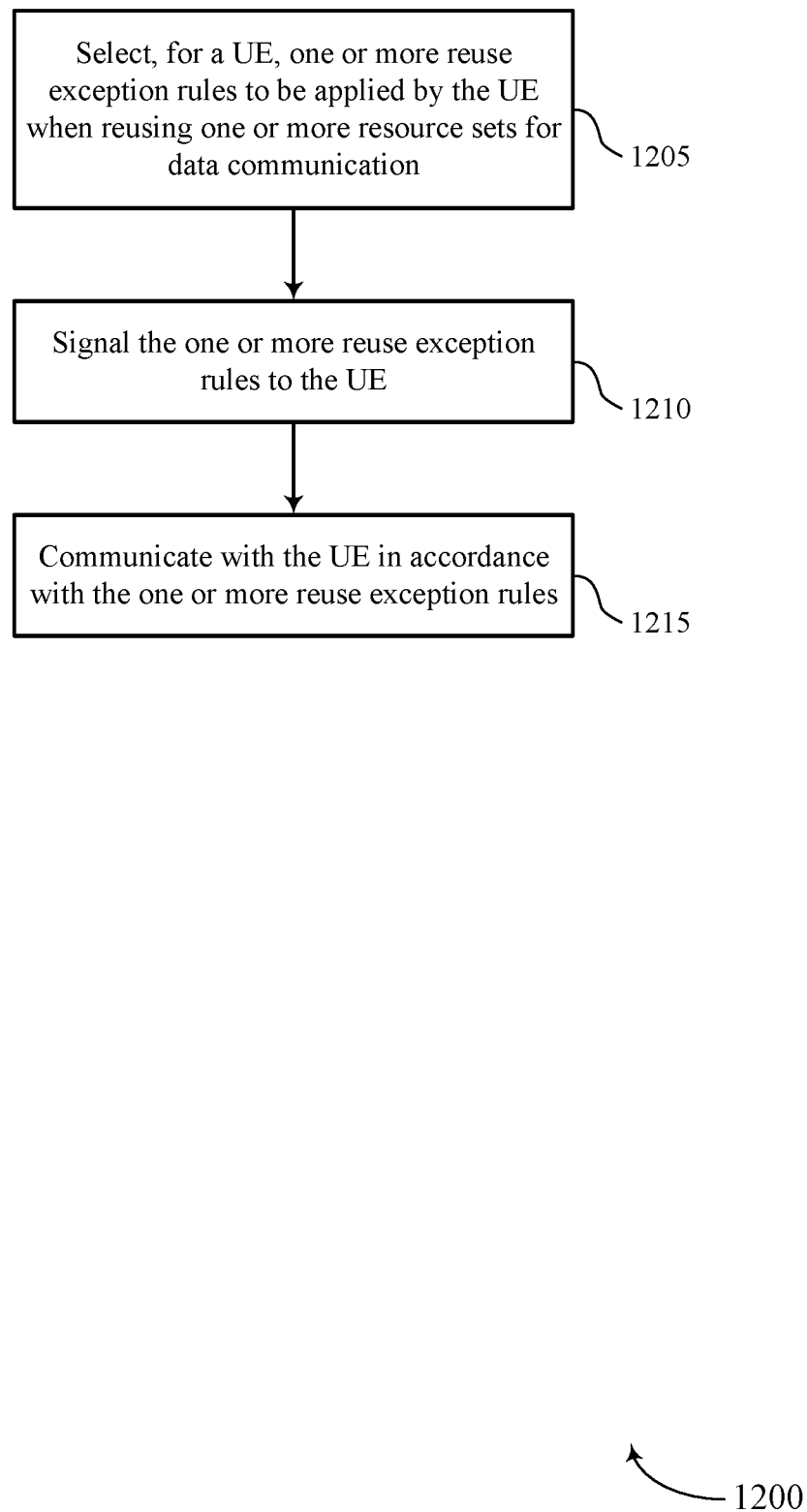
FIGS. 12 through 15 illustrate methods for search space-based reuse exception rules in accordance with aspects of the present disclosure.

FIG. 12 shows a flowchart illustrating a method 1200 for search space-based reuse exception rules in accordance with aspects of the present disclosure. The operations of method 1200 may be implemented by a base station 105 or its components as described herein. For example, the operations of method 1200 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1205 the base station 105 may select, for a UE, one or more reuse exception rules to be applied by the UE when reusing one or more resource sets for data communication. The operations of block 1205 may be performed according to the methods described herein. In certain examples, aspects of the operations of block 1205 may be performed by a reuse exception rule selector as described with reference to FIGS. 4 through 7.

At block 1210 the base station 105 may signal the one or more reuse exception rules to the UE. The operations of block 1210 may be performed according to the methods described herein. In certain examples, aspects of the operations of block 1210 may be performed by a reuse exception rule signaler as described with reference to FIGS. 4 through 7.

At block 1215 the base station 105 may communicate with the UE in accordance with the one or more reuse exception rules. The operations of block 1215 may be performed according to the methods described herein. In certain examples, aspects of the operations of block 1215 may be performed by a resource reuse manager as described with reference to FIGS. 4 through 7.

Figure 13:
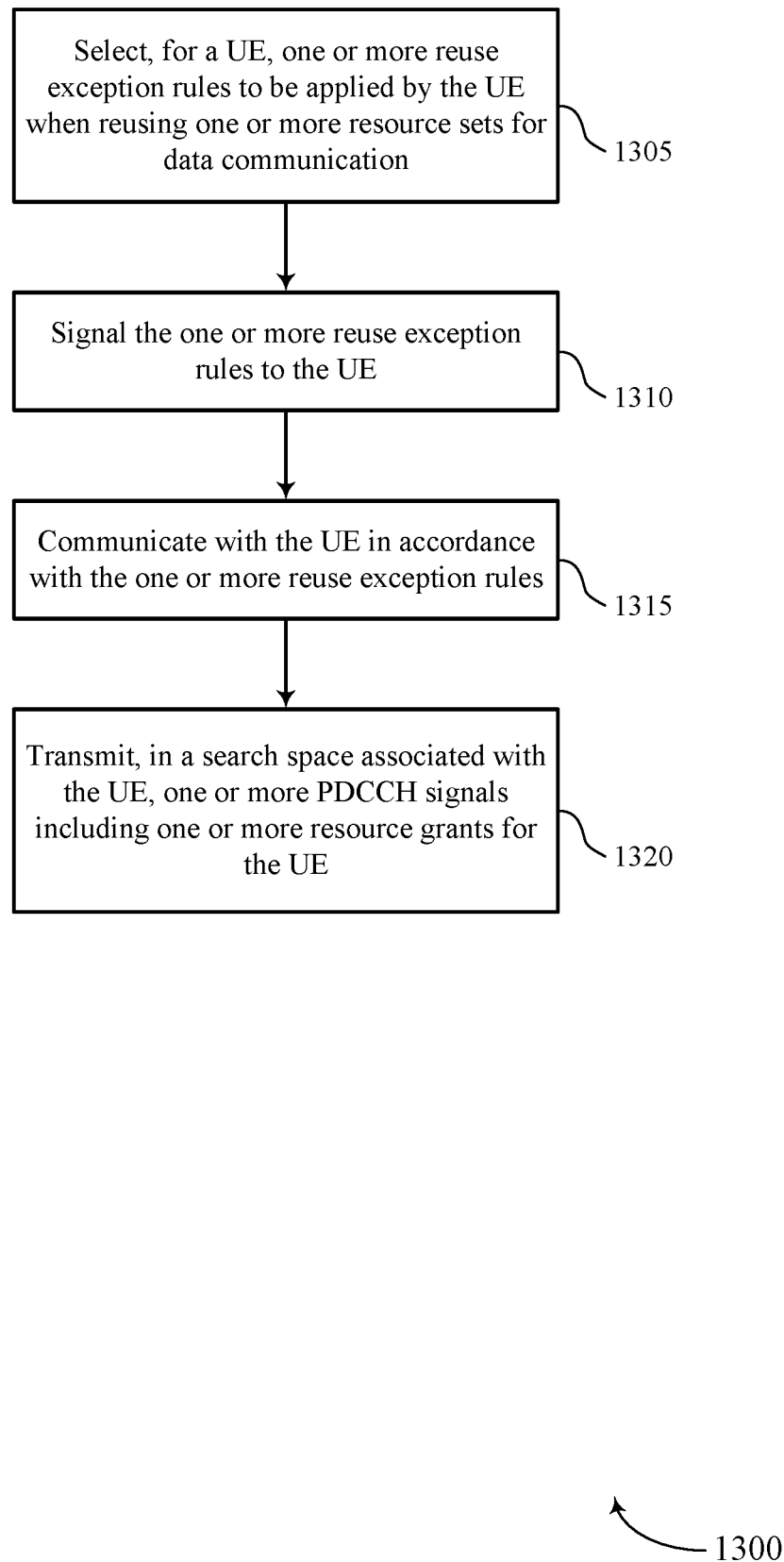

FIG. 13 shows a flowchart illustrating a method 1300 for search space-based reuse exception rules in accordance with aspects of the present disclosure. The operations of method 1300 may be implemented by a base station 105 or its components as described herein. For example, the operations of method 1300 may be performed by a base station communications manager as described with reference to FIGS. 4 through 7. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may select, for a UE, one or more reuse exception rules to be applied by the UE when reusing one or more resource sets for data communication. The operations of block 1305 may be performed according to the methods described herein. In certain examples, aspects of the operations of block 1305 may be performed by a reuse exception rule selector as described with reference to FIGS. 4 through 7.

At block 1310 the base station 105 may signal the one or more reuse exception rules to the UE. The operations of block 1310 may be performed according to the methods described herein. In certain examples, aspects of the operations of block 1310 may be performed by a reuse exception rule signaler as described with reference to FIGS. 4 through 7.

At block 1315 the base station 105 may communicate with the UE in accordance with the one or more reuse exception rules. The operations of block 1315 may be performed according to the methods described herein. In certain examples, aspects of the operations of block 1315 may be performed by a resource reuse manager as described with reference to FIGS. 4 through 7.

At block 1320 the base station 105 may transmit, in a search space associated with the UE, one or more PDCCH signals comprising one or more resource grants for the UE. The operations of block 1320 may be performed according to the methods described herein. In certain examples, aspects of the operations of block 1320 may be performed by a search space manager as described with reference to FIGS. 4 through 7.

Figure 14:
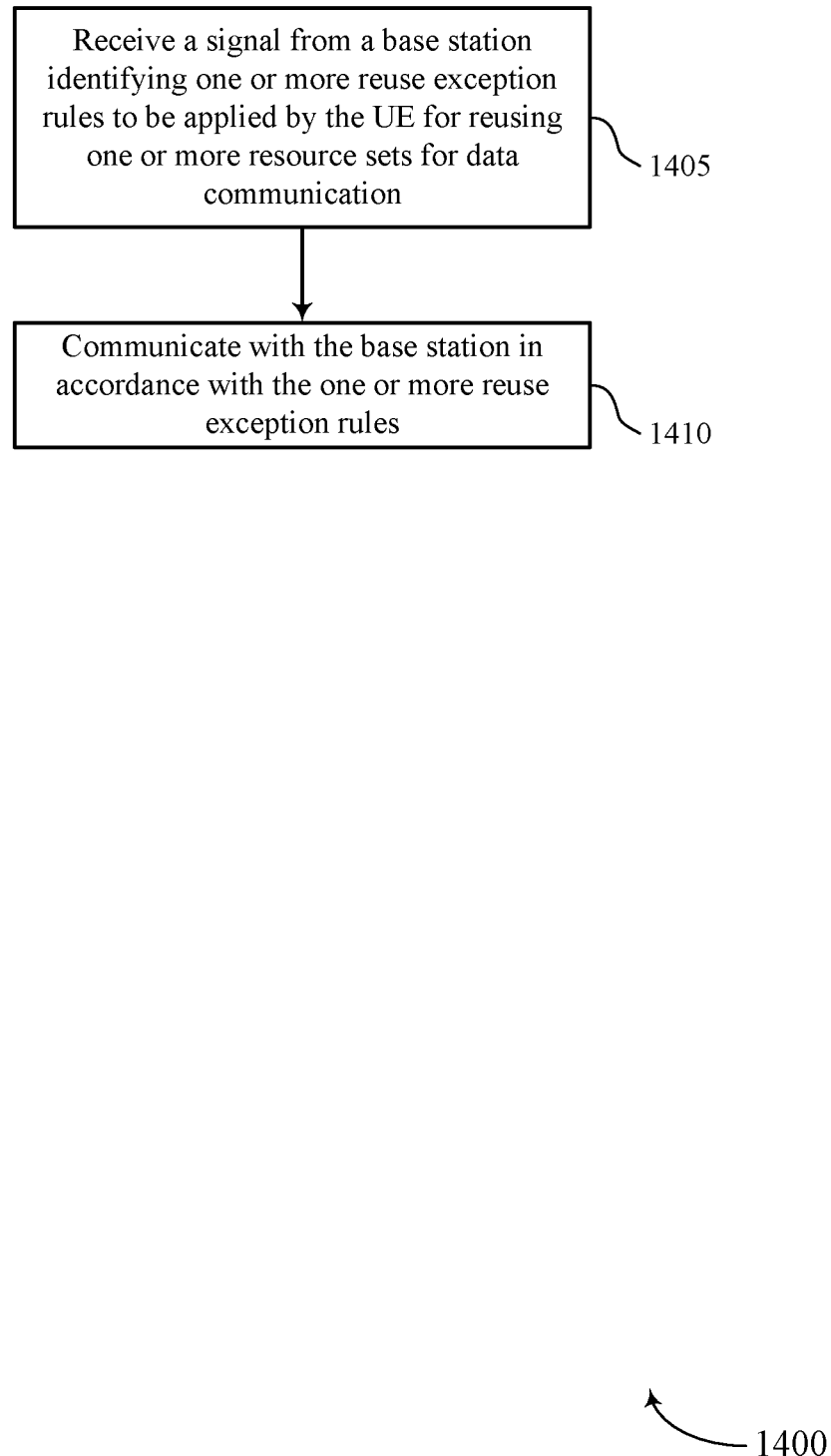

FIG. 14 shows a flowchart illustrating a method 1400 for search space-based reuse exception rules in accordance with aspects of the present disclosure. The operations of method 1400 may be implemented by a UE 115 or its components as described herein. For example, the operations of method 1400 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a signal from a base station identifying one or more reuse exception rules to be applied by the UE for reusing one or more resource sets for data communication. The operations of block 1405 may be performed according to the methods described herein. In certain examples, aspects of the operations of block 1405 may be performed by a reuse exception indication manager as described with reference to FIGS. 8 through 11.

At block 1410 the UE 115 may communicate with the base station in accordance with the one or more reuse exception rules. The operations of block 1410 may be performed according to the methods described herein. In certain examples, aspects of the operations of block 1410 may be performed by a resource reuse manager as described with reference to FIGS. 8 through 11.

Figure 15:
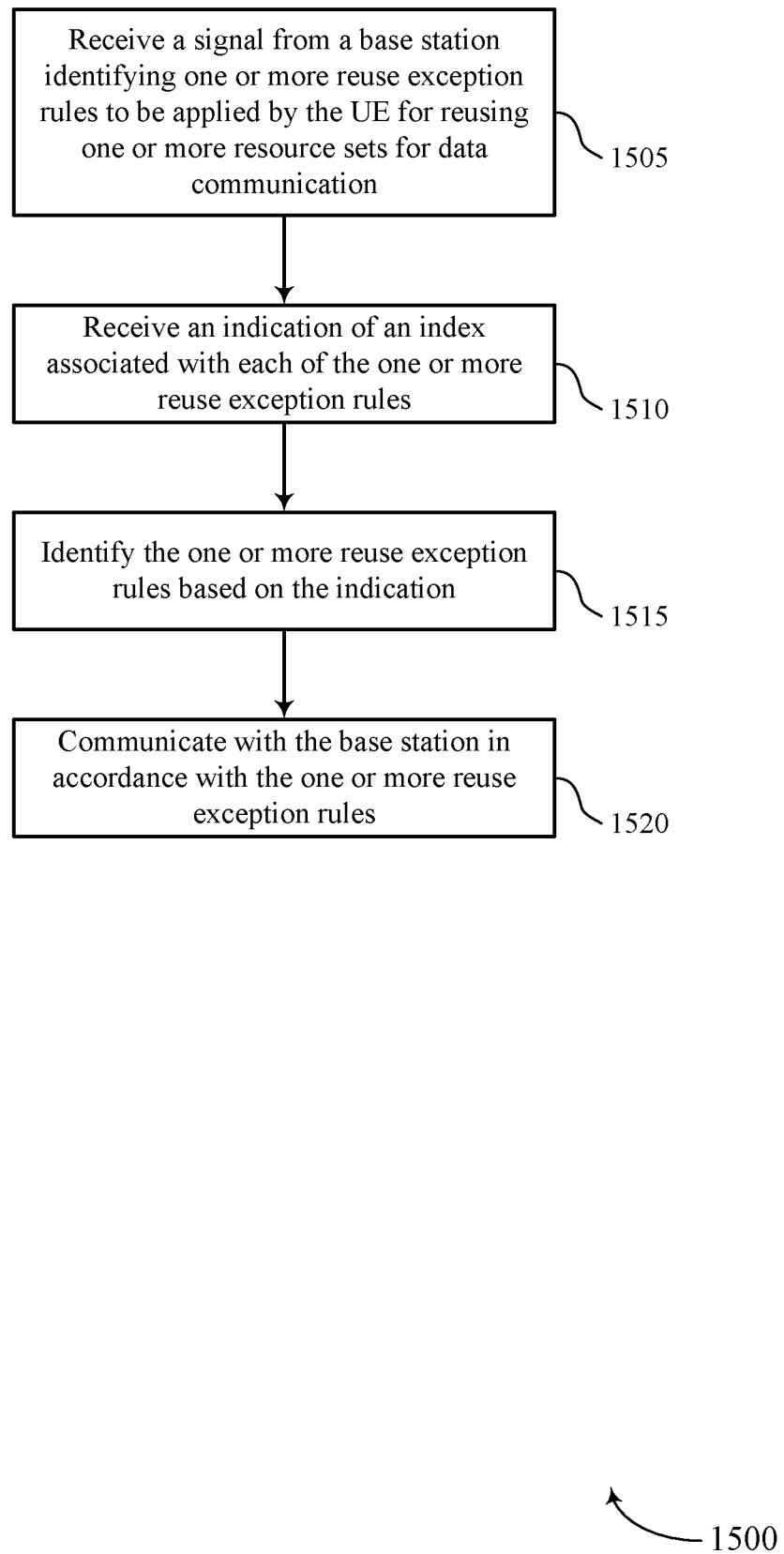

FIG. 15 shows a flowchart illustrating a method 1500 for search space-based reuse exception rules in accordance with aspects of the present disclosure. The operations of method 1500 may be implemented by a UE 115 or its components as described herein. For example, the operations of method 1500 may be performed by a UE communications manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a signal from a base station identifying one or more reuse exception rules to be applied by the UE for reusing one or more resource sets for data communication. The operations of block 1505 may be performed according to the methods described herein. In certain examples, aspects of the operations of block 1505 may be performed by a reuse exception indication manager as described with reference to FIGS. 8 through 11.

At block 1510 the UE 115 may receive an indication of an index associated with each of the one or more reuse exception rules. The operations of block 1510 may be performed according to the methods described herein. In certain examples, aspects of the operations of block 1510 may be performed by a index manager as described with reference to FIGS. 8 through 11.

At block 1515 the UE 115 may identify the one or more reuse exception rules based at least in part on the indication. The operations of block 1515 may be performed according to the methods described herein. In certain examples, aspects of the operations of block 1515 may be performed by a index manager as described with reference to FIGS. 8 through 11.

At block 1520 the UE 115 may communicate with the base station in accordance with the one or more reuse exception rules. The operations of block 1520 may be performed according to the methods described herein. In certain examples, aspects of the operations of block 1520 may be performed by a resource reuse manager as described with reference to FIGS. 8 through 11.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a type of search space associated with a user equipment (UE);
   selecting, for the UE, one or more reuse exception rules to be applied by the UE when reusing one or more control resource sets for data communication, the one or more reuse exception rules allowing the UE to reuse a first subset of resources of the one or more control resource sets for data communications, the one or more reuse exception rules configured to indicate a second subset of resources of a search space within the first subset of resources that the UE is to rate match with the data communication, wherein the one or more reuse exception rules are selected based at least in part on the identified type of the search space and wherein the one or more reuse exception rules corresponds to one of a plurality of different types of search spaces;
   signaling the one or more reuse exception rules to the UE; and
   communicating with the UE in accordance with the one or more reuse exception rules.

2. The method of claim 1, wherein:
   selecting the one or more reuse exception rules comprises:
   selecting the one or more reuse exception rules to be applied by the UE from a plurality of search space-based rate matching reuse exception rules each corresponding to one of the plurality of different types of search spaces.

3. The method of claim 1, wherein:
the identified type of the search space within the one or more control resource sets is a group common physical downlink control channel (GC-PDCCH) search space.

4. The method of claim 1, wherein:
the identified type of the search space within the one or more control resource sets is a common physical downlink control channel (PDCCH) search space.

5. The method of claim 1, wherein:
the identified type of the search space within the one or more control resource sets is a UE-specific physical downlink control channel (PDCCH) search space.

6. The method of claim 5, further comprising:
transmitting, in the UE-specific PDCCH search space, one or more PDCCH signals comprising a plurality of resource grants for the UE.

7. The method of claim 1, wherein:
the identified type of the search space within the one or more control resource sets is a UE-specific physical downlink control channel (PDCCH) search space; and
selecting the one or more reuse exception rules comprises: selecting the one or more reuse exception rules that allows the UE to reuse the first subset of resources of the one or more control resource sets, the one or more reuse exception rules configured to indicate a third subset of resources that are within the UE-specific PDCCH search space.

8. The method of claim 7, wherein:
the third subset of resources is determined by an aggregation level (AL) of a current PDCCH granting a physical downlink shared channel (PDSCH) to the UE.

9. The method of claim 8, wherein:
the third subset of resources comprises one or more decoding candidates having a same AL as the AL of the current PDCCH granting the PDSCH to the UE.

10. The method of claim 8, wherein:
the third subset of resources comprises one or more decoding candidates having a same or a lower AL as the AL of the current PDCCH granting the PDSCH to the UE.

11. The method of claim 1, further comprising:
transmitting, in the search space associated with the UE, one or more physical downlink control channel (PDCCH) signals comprising one or more resource grants for the UE.

12. The method of claim 1, wherein:
signaling the one or more reuse exception rules to the UE comprises: identifying an index associated with each of the one or more reuse exception rules; and
the method further comprising communicating an indication of the index to the UE.

13. The method of claim 1, wherein:
signaling the one or more reuse exception rules to the UE comprises: identifying an index associated with a subset of rules of the one or more reuse exception rules; and
the method further comprising communicating an indication of the index to the UE.

14. The method of claim 1, further comprising:
transmitting radio resource control (RRC) signaling to configure the one or more control resource sets; and
transmitting layer one (L1) signaling to indicate reuse of the one or more control resource sets.

15. The method of claim 1, wherein:
the one or more control resource sets comprises a control resource set, or a set of control resource sets, or a subset of resources of a control resource set, or any combinations thereof.

16. A method for wireless communication, comprising:
receiving a signal from a base station identifying one or more reuse exception rules to be applied by a user equipment (UE) for reusing one or more control resource sets for data communication, the one or more reuse exception rules allowing the UE to reuse a first subset of resources of the one or more control resource sets for data communications, the one or more reuse exception rules configured to indicate a second subset of resources of a search space within the first subset of resources that the UE is to rate match with the data communication, wherein the one or more reuse exception rules are selected are based at least in part on an identified type of the search space and wherein the one or more reuse exception rules corresponds to one of a plurality of different types of search spaces; and
communicating with the base station in accordance with the one or more reuse exception rules.

17. The method of claim 16, wherein:
the one or more reuse exception rules to be applied by the UE are search space-based rate matching reuse exception rules.

18. The method of claim 16, further comprising:
identifying that the identified type of the search space is a group common physical downlink control channel (GC-PDCCH) search space associated with the UE; and
applying the one or more reuse exception rules that allows the UE to reuse the first subset of resources of the one or more control resource sets and rate match the data communication with one or more resources of the GC-PDCCH search space within the one or more control resource sets.

19. The method of claim 16, further comprising:
identifying that the identified type of the search space is a common physical downlink control channel (PDCCH) search space associated with the UE; and
applying the one or more reuse exception rules that allows the UE to reuse the first subset of resources of the one or more control resource sets and rate match the data communication with one or more resources of the common PDCCH search space within the one or more control resource sets.

20. The method of claim 16, further comprising:
identifying that the identified type of the search space is a UE-specific physical downlink control channel (PDCCH) search space associated with the UE; and
applying the one or more reuse exception rules that allows the UE to reuse the first subset of resources of the one or more control resource sets and rate match the data communication with one or more resources of the UE-specific PDCCH search space within the one or more control resource sets.

21. The method of claim 20, further comprising:
receiving, in the UE-specific PDCCH search space, one or more PDCCH signals comprising a plurality of resource grants for the UE.

22. The method of claim 16, further comprising:
identifying that the identified type of the search space is a UE-specific physical downlink control channel (PDCCH) search space associated with the UE; and applying the one or more reuse exception rules that allows the UE to reuse the first subset of resources of the one or more control resource sets and rate match the data communication with one or more resources of a subset of the UE-specific PDCCH search space within the one or more control resource sets.

23. The method of claim 22, wherein:
the subset of the UE-specific PDCCH search space is determined by an aggregation level (AL) of a current PDCCH granting a physical downlink shared channel (PDSCH) to the UE.

24. The method of claim 23, wherein:
the subset of the UE-specific PDCCH search space comprises one or more decoding candidates having a same AL as the AL of the current PDCCH granting the PDSCH to the UE.

25. The method of claim 23, wherein:
the subset of the UE-specific PDCCH search space comprises one or more decoding candidates having a same or a lower AL as the AL of the current PDCCH granting the PDSCH to the UE.

26. The method of claim 16, further comprising:
receiving, in the search space associated with the UE, one or more physical downlink control channel (PDCCH) signals comprising one or more resource grants for the UE.

27. The method of claim 16, further comprising:
receiving an indication of an index associated with each of the one or more reuse exception rules; and
identifying the one or more reuse exception rules based at least in part on the indication.

28. The method of claim 16, further comprising:
receiving an indication of an index associated with a subset of rules of the one or more reuse exception rules; and
identifying the one or more reuse exception rules based at least in part on the indication.

29. An apparatus for wireless communication, comprising:
a processor;
memory coupled with the processor; and
instructions stored in the memory and operable, when executed by the processor, to cause the apparatus to:
identify a type of search space associated with a user equipment (UE);
select, for the UE, one or more reuse exception rules to be applied by the UE when reusing one or more control resource sets for data communication, the one or more reuse exception rules allowing the UE to reuse a first subset of resources of the one or more control resource sets for data communications, the one or more reuse exception rules configured to indicate a second subset of resources of a search space within the first subset of resources that the UE is to rate match with the data communication, wherein the one or more reuse exception rules are selected are based at least in part on the identified type of the search space and wherein the one or more reuse exception rules corresponds to one of a plurality of different types of search spaces;
signal the one or more reuse exception rules to the UE; and
communicate with the UE in accordance with the one or more reuse exception rules.

30. An apparatus for wireless communication, comprising:
a processor;
memory coupled with the processor; and
instructions stored in the memory and operable, when executed by the processor, to cause the apparatus to:
receive a signal from a base station identifying one or more reuse exception rules to be applied by a user equipment (UE) for reusing one or more control resource sets for data communication, the one or more reuse exception rules allowing the UE to reuse a first subset of resources of the one or more control resource sets for data communications, the one or more reuse exception rules configured to indicate a second subset of resources of a search space within the first subset of resources that the UE is to rate match with the data communication, wherein the one or more reuse exception rules are selected are based at least in part on an identified type of the search space and wherein the one or more reuse exception rules corresponds to one of a plurality of different types of search spaces; and
communicate with the base station in accordance with the one or more reuse exception rules.

* * * * *